US012699883B2

(12) United States Patent
Galvin

(10) Patent No.: US 12,699,883 B2
(45) Date of Patent: *Aug. 4, 2026

(54) CONTINUOUS AND INFINITE VIDEO ZOOM USING HIERARCHICAL AND LORENTZIAN AUTOENCODERS

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/204,525

(22) Filed: May 10, 2025

(65) Prior Publication Data

US 2025/0265760 A1     Aug. 21, 2025

Related U.S. Application Data

(63) Continuation-in-part of application No. 19/192,215, filed on Apr. 28, 2025, which is a continuation-in-part (Continued)

(51) Int. Cl.
*G06T 13/80*          (2011.01)
*G06T 3/16*           (2024.01)
(Continued)

(52) U.S. Cl.
CPC ................ *G06T 13/80* (2013.01); *G06T 3/16* (2024.01); *G06T 3/4046* (2013.01); *G06T 5/50* (2013.01);
(Continued)

(58) Field of Classification Search
CPC ......... G06T 13/80; G06T 3/16; G06T 3/4046; G06T 5/50; G06T 5/60; G06T 9/002;
(Continued)

(56) References Cited

U.S. PATENT DOCUMENTS 7,629,922 B2     12/2009    Winstead et al.
7,876,257 B2     1/2011     Vetro et al.
(Continued)

FOREIGN PATENT DOCUMENTS

WO     WO-2022139618 A1 *    6/2022     ............. G06N 3/088

OTHER PUBLICATIONS

Cano, C. et al. "A Deep Learning Approach for enhancing the Lorentzian Curve Fit algorithm for Schumann Resonance", Journal of Latex Class Files, vol. 14, No. 8, Aug. 2015, pp. 1-11. (Year: 2015).*

(Continued)

*Primary Examiner* — Jose L Couso
(74) *Attorney, Agent, or Firm* — GALVIN PATENT LAW LLC; Brian R. Galvin; Alec L. Perry

(57)          ABSTRACT

A system and method for compressing and restoring data using hierarchical autoencoders and Lorentzian autoencoders for video processing. For general data, the system employs hierarchical autoencoders operating at multiple scales. For video data, Lorentzian autoencoders preserve three-dimensional tensor structure where spatial and temporal relationships remain intact throughout compression and decompression. A correlation network, trained on cross-correlated data sets, enhances restoration by leveraging relationships between compressed representations, recovering information lost during compression. The Lorentzian approach enables advanced video features including temporal prediction and infinite zoom, where users can examine regions beyond original resolution with synthesized yet plausible details. This architecture achieves higher compression ratios while maintaining or improving data quality, particularly for video content where spatiotemporal coherence is critical, applicable to surveillance, medical imaging, entertainment, and remote sensing.

10 Claims, 24 Drawing Sheets

Related U.S. Application Data of application No. 18/972,797, filed on Dec. 6, 2024, now Pat. No. 12,294,392, which is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(51) Int. Cl.
    *G06T 3/4046*     (2024.01)
    *G06T 5/50*     (2006.01)
    *G06T 5/60*     (2024.01)
    *G06T 9/00*     (2006.01)

(52) U.S. Cl.
    CPC ................ *G06T 5/60* (2024.01); *G06T 9/002* (2013.01); *G06T 2200/24* (2013.01); *G06T 2207/10016* (2013.01); *G06T 2207/20084* (2013.01); *G06T 2207/20104* (2013.01); *G06T 2210/36* (2013.01)

(58) Field of Classification Search
    CPC ....... G06T 2200/24; G06T 2207/10016; G06T 2207/20084; G06T 2207/20104; G06T 2210/36; G06T 15/10; G06T 17/00; G06T 2207/10044; G06T 2207/10032; G06T 2207/30181; G06T 9/00; G06T 9/004; G06T 9/007; G06T 3/4053; G06T 2207/20076; G06T 2207/20081; G06T 2211/441; G06N 3/047; G06N 3/0475; G06N 3/0464; G06N 3/0455; G06N 3/02; G06N 3/08–088; G06N 3/04; G06N 3/0445; G06N 3/0454; G06N 3/4046; G06N 3/4053; G06N 3/049; G06N 3/0499; G06N 7/00; G06N 7/01; G06N 20/00; G06Q 10/40; G06Q 50/50; G06Q 2220/00; G06Q 10/04; G06Q 10/06; H04N 19/17; H04N 19/30; H04N 19/436; H04N 19/48; H04N 19/85; H04N 19/80; H04N 19/14; H04N 19/33; H04N 19/59; H04N 19/154; H04N 19/86; H04N 19/395; H04N 19/503; H04N 19/61; H04N 19/117; H04N 19/132; H04N 19/124; H04N 19/42; H03M 7/3097; H03M 7/6041; H03M 7/3059; H03M 7/3077; H03M 7/30; H03M 7/40; H03M 7/3062; H03M 7/3082; H03M 7/4006; G01S 13/90; G01S 13/9004; G01S 13/904; G01S 13/9017; G01S 13/9076; G01S 13/9021; G01S 17/90; G01S 7/417; G01S 7/2886; G06V 20/13; G06V 20/10; G06V 20/46; G06V 20/40; G06V 10/467; G06V 10/454; G06V 10/54; G06V 10/70; G06V 10/7764; G06V 10/774; G06V 10/82; G06V 10/84; G06V 20/41; G06V 30/18057; G06V 20/698; G06V 30/19173; G06V 30/194; G10L 19/008; G10L 25/30; G06F 16/9537; G06F 18/213; G06F 18/214; G06F 18/22; G06F 18/241; G06F 18/24; G06F 18/2411; G06F 18/2415; G06F 18/253; G06F 30/27; G06K 7/1482; Y10S 128/925
    See application file for complete search history.

(56) References Cited

U.S. PATENT DOCUMENTS

| | | | | |
|---|---|---|---|---|
| 8,879,857 | B2 * | 11/2014 | Raveendran | H04N 19/18 |
| | | | | 375/240 |
| 9,258,519 | B2 * | 2/2016 | Shi | H04N 19/587 |
| 9,313,526 | B2 * | 4/2016 | Bivolarsky | H04N 19/46 |
| 9,813,707 | B2 * | 11/2017 | Zhang | H04N 19/139 |
| 11,234,006 | B2 | 1/2022 | Wang et al. | |
| 11,656,353 | B2 | 5/2023 | Li et al. | |
| 11,729,406 | B2 | 8/2023 | Habibian et al. | |
| 11,915,690 | B1 | 2/2024 | Chang et al. | |
| 2019/0045207 | A1 * | 2/2019 | Chen | G06F 21/44 |
| 2019/0355103 | A1 * | 11/2019 | Baek | G06T 5/77 |
| 2020/0272605 | A1 | 8/2020 | More | |
| 2020/0404340 | A1 | 12/2020 | Xu et al. | |
| 2022/0018922 | A1 * | 1/2022 | Shim | G06N 3/088 |
| 2022/0246158 | A1 | 8/2022 | Nam et al. | |

OTHER PUBLICATIONS

Hao Z. et al., "Lorentz group equivariant autoencoders", Experimental Physics, vol. 83, article No. 485, Jun. 9, 2023, pp. 1-15. (Year: 2023).*

* cited by examiner

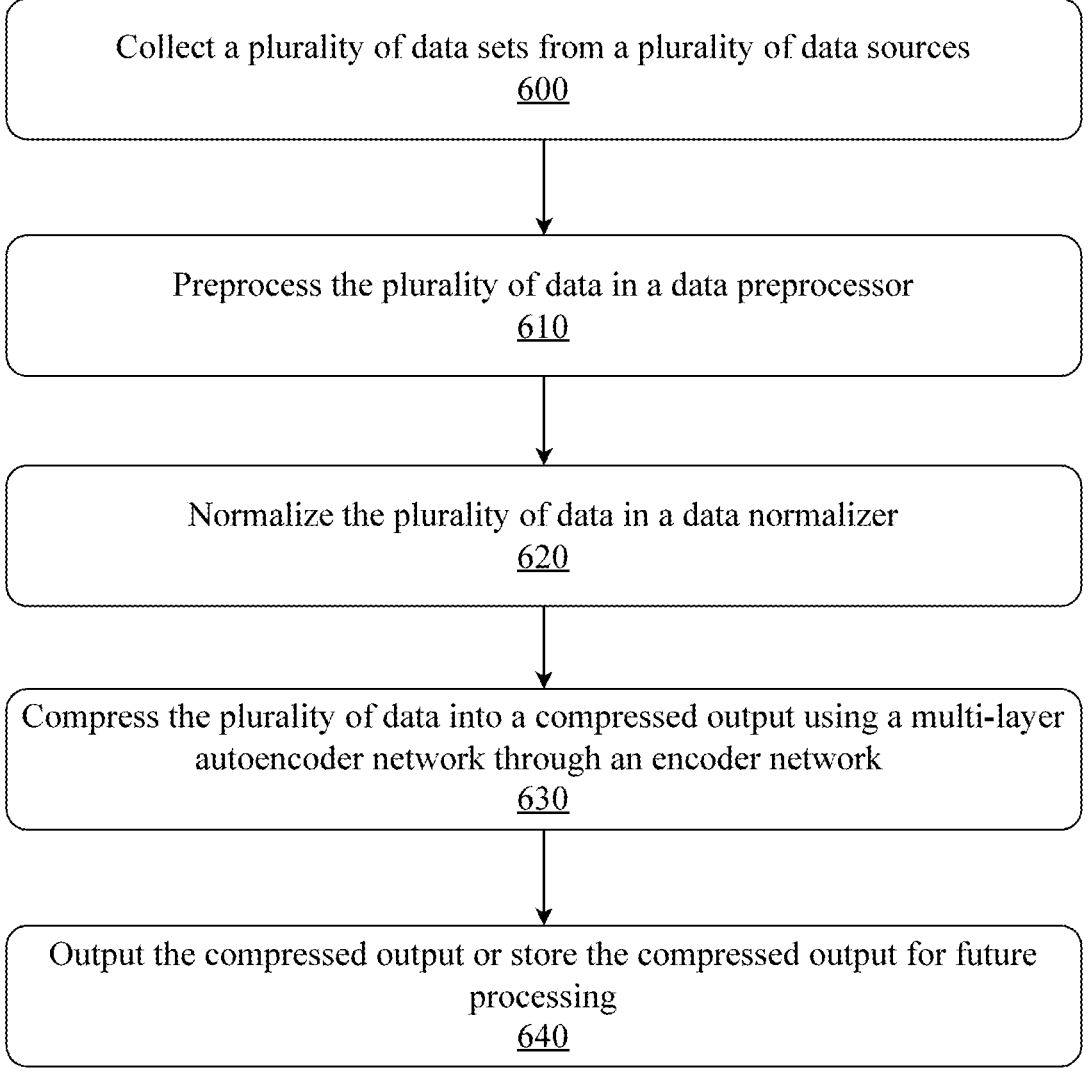

Collect a plurality of data sets from a plurality of data sources
600

Preprocess the plurality of data in a data preprocessor
610

Normalize the plurality of data in a data normalizer
620

Compress the plurality of data into a compressed output using a multi-layer autoencoder network through an encoder network
630

Output the compressed output or store the compressed output for future processing
640

FIG. 6

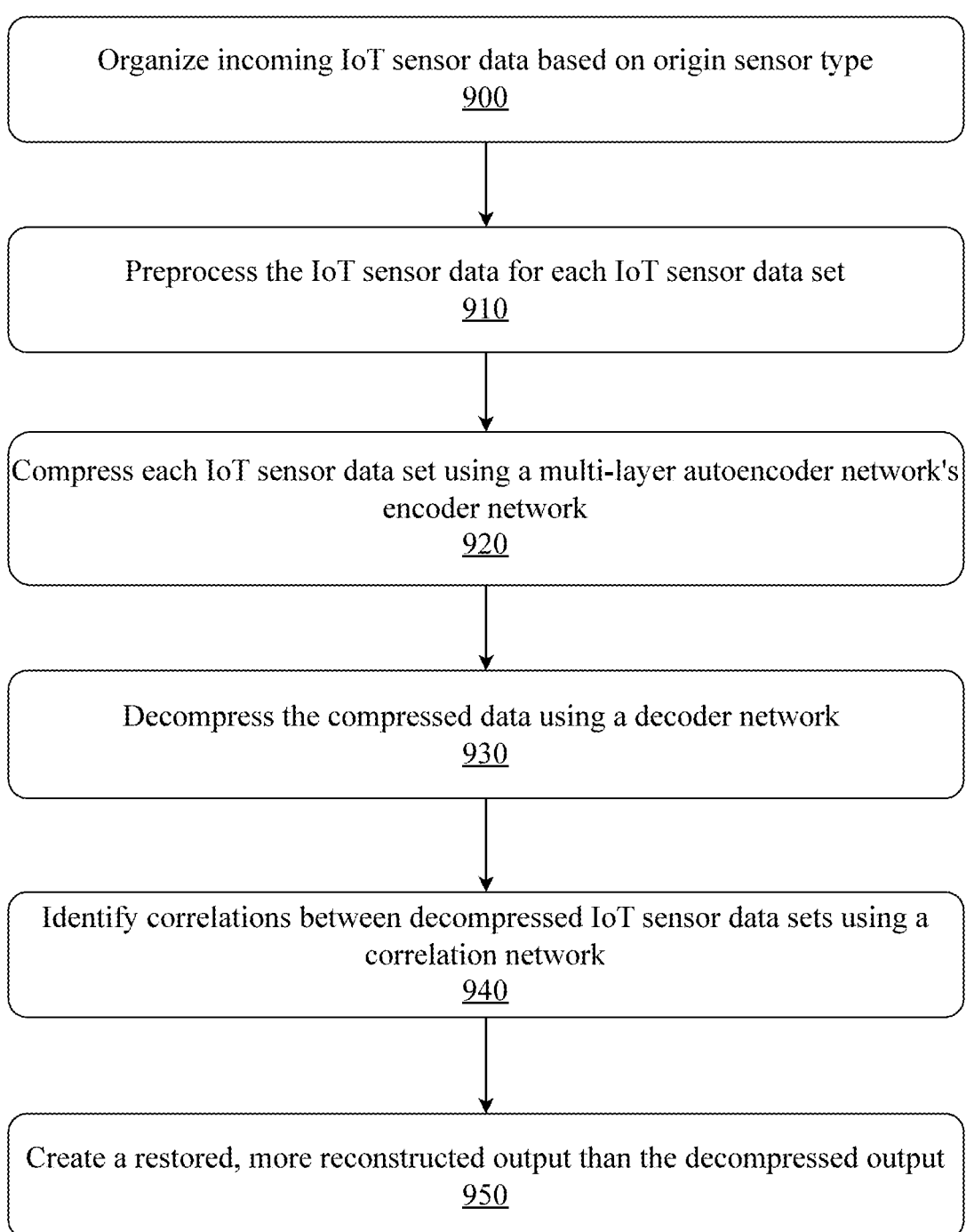

Organize incoming IoT sensor data based on origin sensor type
900

Preprocess the IoT sensor data for each IoT sensor data set
910

Compress each IoT sensor data set using a multi-layer autoencoder network's encoder network
920

Decompress the compressed data using a decoder network
930

Identify correlations between decompressed IoT sensor data sets using a correlation network
940

Create a restored, more reconstructed output than the decompressed output
950

FIG. 9

Access a plurality of restored data sets
1100

Organize the plurality of restored data sets based on similarities if necessary
1110

Output a plurality of restored, potentially organized data sets
1120

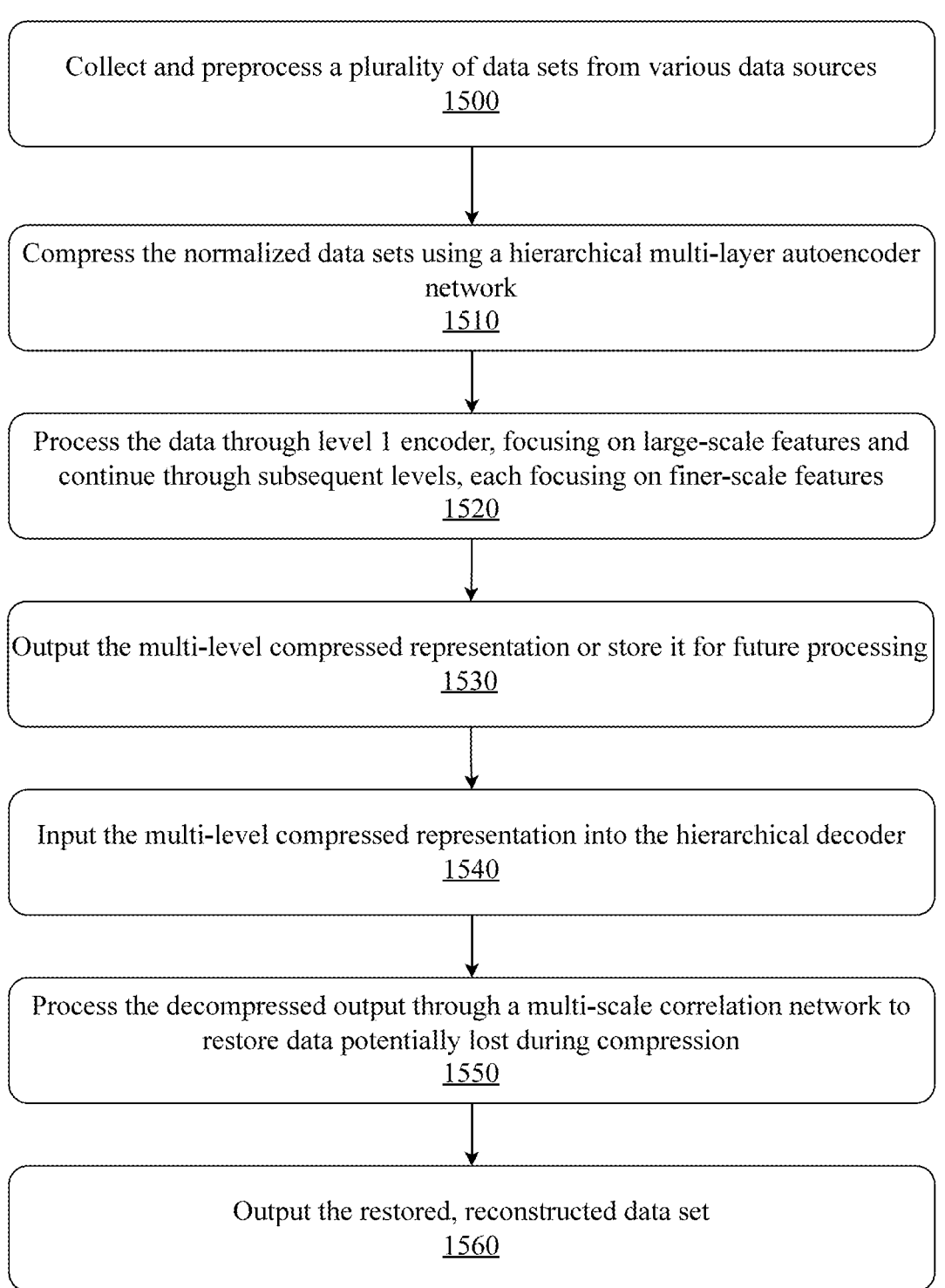

Collect and preprocess a plurality of data sets from various data sources
1500

Compress the normalized data sets using a hierarchical multi-layer autoencoder network
1510

Process the data through level 1 encoder, focusing on large-scale features and continue through subsequent levels, each focusing on finer-scale features
1520

Output the multi-level compressed representation or store it for future processing
1530

Input the multi-level compressed representation into the hierarchical decoder
1540

Process the decompressed output through a multi-scale correlation network to restore data potentially lost during compression
1550

Output the restored, reconstructed data set
1560

FIG. 15

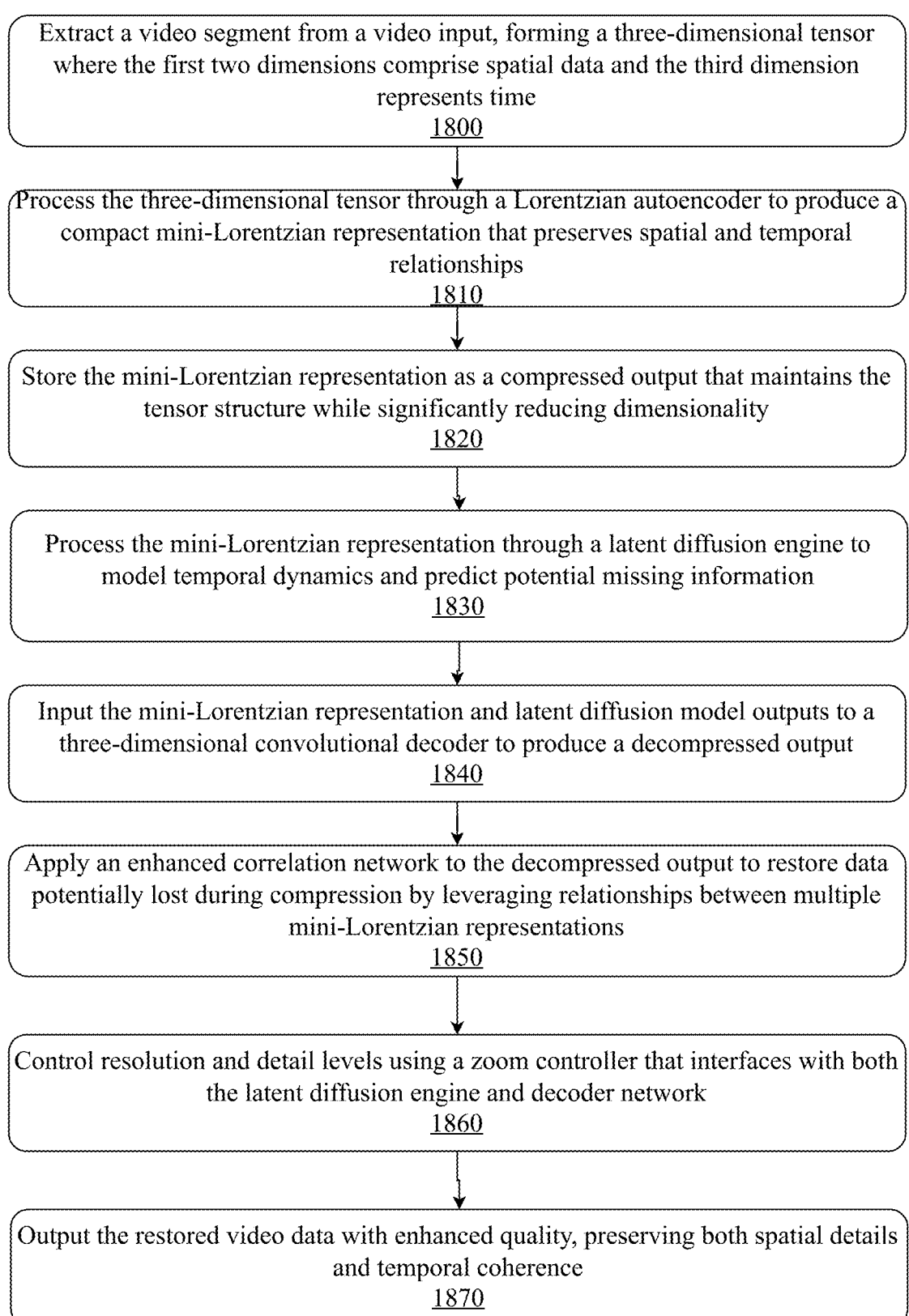

Extract a video segment from a video input, forming a three-dimensional tensor where the first two dimensions comprise spatial data and the third dimension represents time
1800

Process the three-dimensional tensor through a Lorentzian autoencoder to produce a compact mini-Lorentzian representation that preserves spatial and temporal relationships
1810

Store the mini-Lorentzian representation as a compressed output that maintains the tensor structure while significantly reducing dimensionality
1820

Process the mini-Lorentzian representation through a latent diffusion engine to model temporal dynamics and predict potential missing information
1830

Input the mini-Lorentzian representation and latent diffusion model outputs to a three-dimensional convolutional decoder to produce a decompressed output
1840

Apply an enhanced correlation network to the decompressed output to restore data potentially lost during compression by leveraging relationships between multiple mini-Lorentzian representations
1850

Control resolution and detail levels using a zoom controller that interfaces with both the latent diffusion engine and decoder network
1860

Output the restored video data with enhanced quality, preserving both spatial details and temporal coherence
1870

FIG. 18

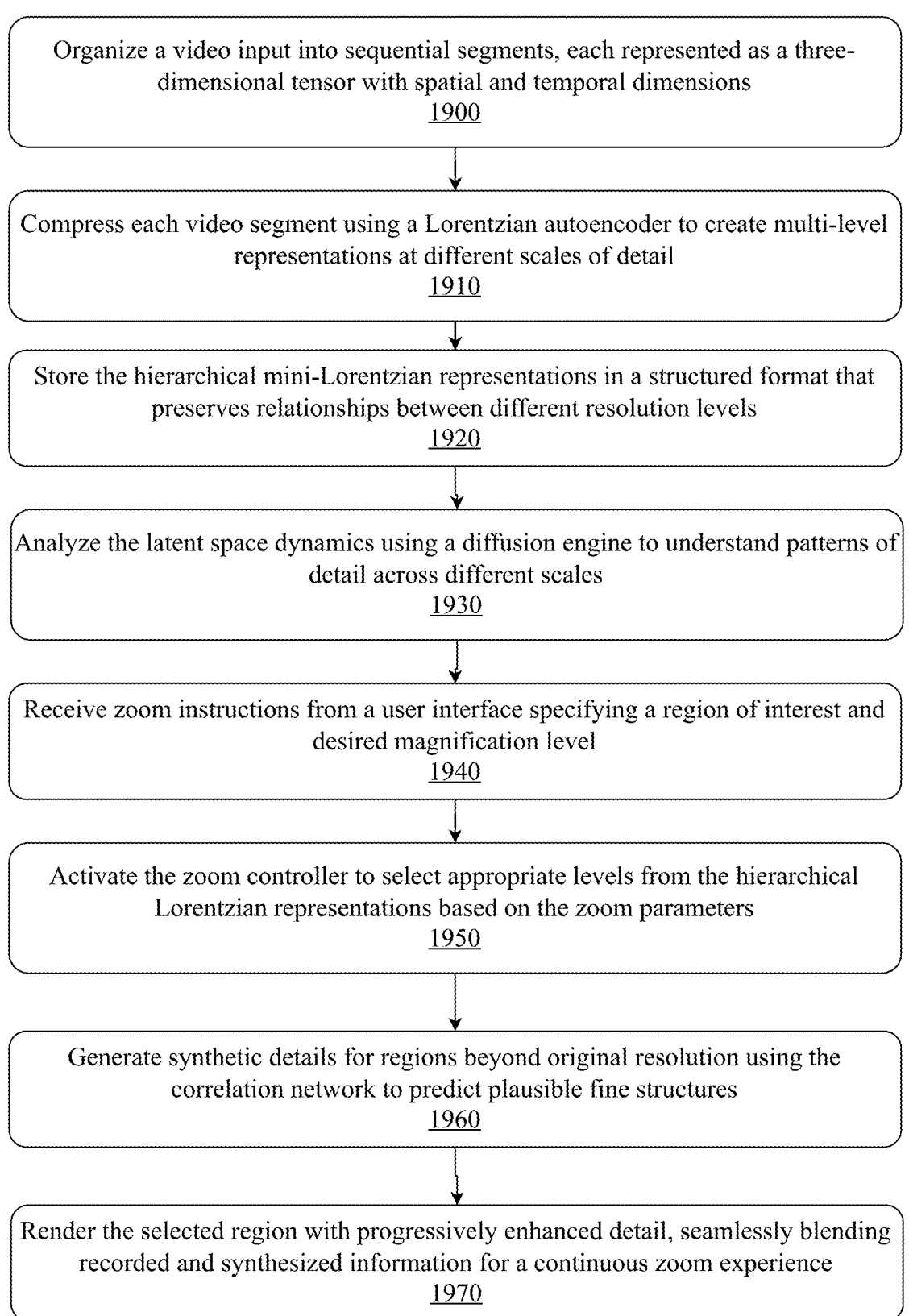

Organize a video input into sequential segments, each represented as a three-dimensional tensor with spatial and temporal dimensions
1900

Compress each video segment using a Lorentzian autoencoder to create multi-level representations at different scales of detail
1910

Store the hierarchical mini-Lorentzian representations in a structured format that preserves relationships between different resolution levels
1920

Analyze the latent space dynamics using a diffusion engine to understand patterns of detail across different scales
1930

Receive zoom instructions from a user interface specifying a region of interest and desired magnification level
1940

Activate the zoom controller to select appropriate levels from the hierarchical Lorentzian representations based on the zoom parameters
1950

Generate synthetic details for regions beyond original resolution using the correlation network to predict plausible fine structures
1960

Render the selected region with progressively enhanced detail, seamlessly blending recorded and synthesized information for a continuous zoom experience
1970

FIG. 19

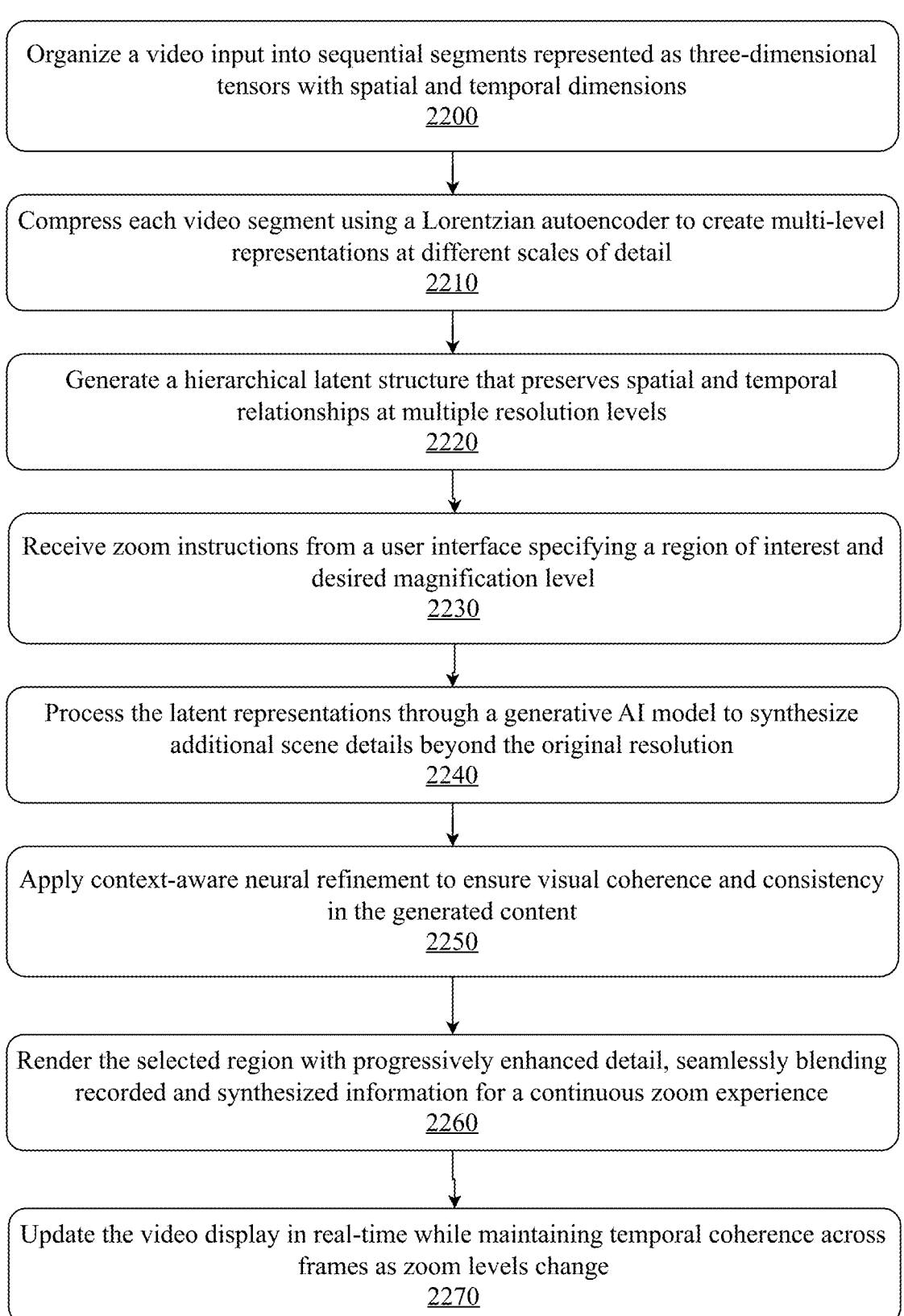

Organize a video input into sequential segments represented as three-dimensional tensors with spatial and temporal dimensions
2200

Compress each video segment using a Lorentzian autoencoder to create multi-level representations at different scales of detail
2210

Generate a hierarchical latent structure that preserves spatial and temporal relationships at multiple resolution levels
2220

Receive zoom instructions from a user interface specifying a region of interest and desired magnification level
2230

Process the latent representations through a generative AI model to synthesize additional scene details beyond the original resolution
2240

Apply context-aware neural refinement to ensure visual coherence and consistency in the generated content
2250

Render the selected region with progressively enhanced detail, seamlessly blending recorded and synthesized information for a continuous zoom experience
2260

Update the video display in real-time while maintaining temporal coherence across frames as zoom levels change
2270

FIG. 22

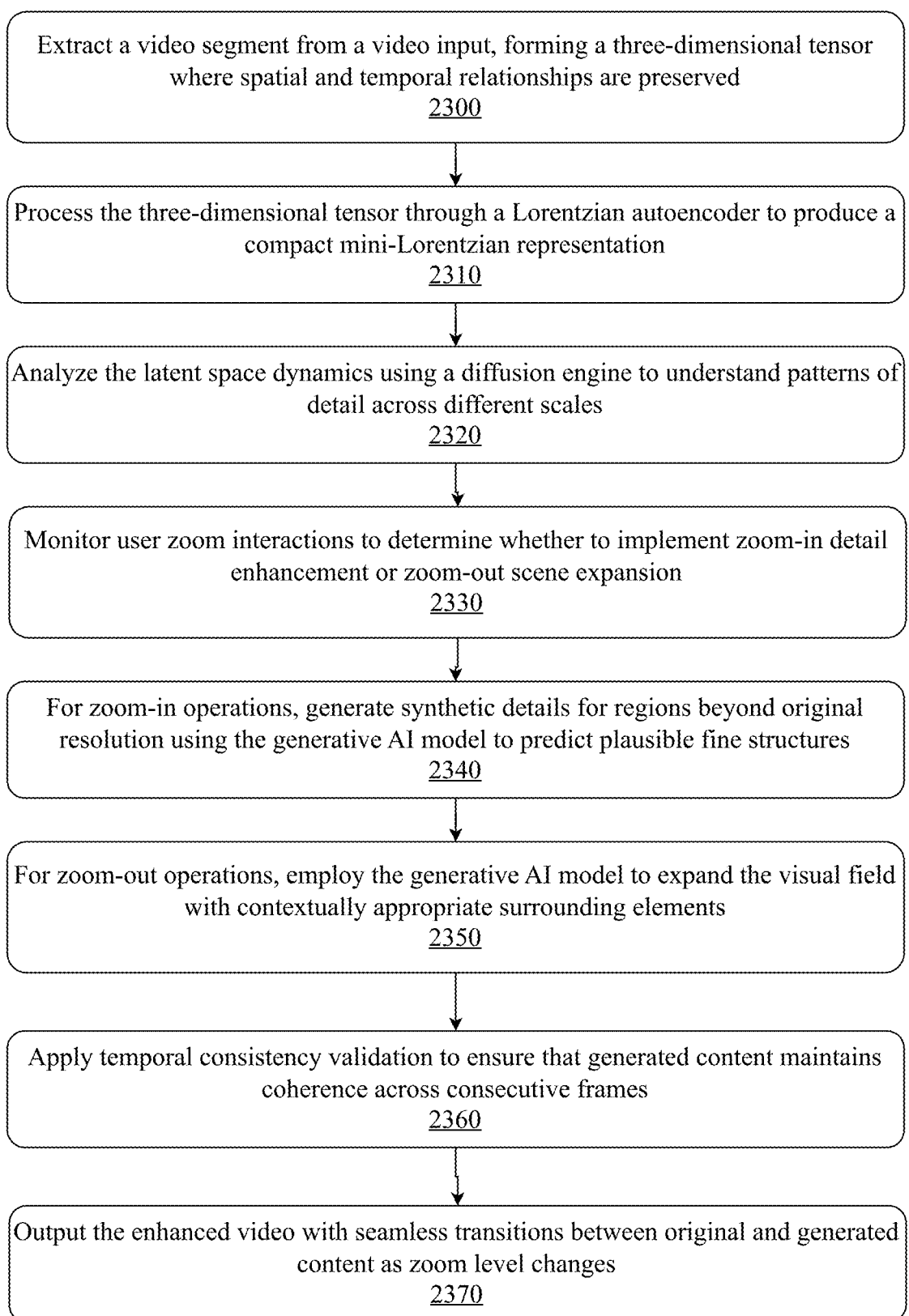

Extract a video segment from a video input, forming a three-dimensional tensor where spatial and temporal relationships are preserved
2300

Process the three-dimensional tensor through a Lorentzian autoencoder to produce a compact mini-Lorentzian representation
2310

Analyze the latent space dynamics using a diffusion engine to understand patterns of detail across different scales
2320

Monitor user zoom interactions to determine whether to implement zoom-in detail enhancement or zoom-out scene expansion
2330

For zoom-in operations, generate synthetic details for regions beyond original resolution using the generative AI model to predict plausible fine structures
2340

For zoom-out operations, employ the generative AI model to expand the visual field with contextually appropriate surrounding elements
2350

Apply temporal consistency validation to ensure that generated content maintains coherence across consecutive frames
2360

Output the enhanced video with seamless transitions between original and generated content as zoom level changes
2370

FIG. 23

CONTINUOUS AND INFINITE VIDEO ZOOM USING HIERARCHICAL AND LORENTZIAN AUTOENCODERS

CROSS-REFERENCE TO RELATED APPLICATIONS

Priority is claimed in the application data sheet to the following patents or patent applications, each of which is expressly incorporated herein by reference in its entirety:

Ser. No. 19/192,215
Ser. No. 18/972,797
Ser. No. 18/648,340
Ser. No. 18/427,716
Ser. No. 18/410,980
Ser. No. 18/537,728

BACKGROUND OF THE INVENTION

Field of the Art

The present invention relates to the field of deep learning and data compression. More specifically, the invention pertains to systems and methods that utilize multi-layer autoencoder for data compression and restoration.

Discussion of the State of the Art

The In recent years, deep learning approaches have shown promising results in data compression and restoration. Autoencoders, a type of neural network architecture, have emerged as a powerful tool for learning compact representations of data. Autoencoders consist of an encoder network that maps input data to a lower-dimensional latent space and a decoder network that reconstructs the original data from the latent representation.

Multi-layer autoencoders, also known as stacked autoencoders or deep autoencoders, have been proposed to learn hierarchical representations of data. These architectures stack multiple layers of encoders and decoders, allowing for more complex and abstract feature learning. Multi-layer autoencoders have been successfully applied in various domains, such as image compression, video compression, and speech enhancement. However, existing multi-layer autoencoder architectures often focus solely on the compression aspect and do not fully exploit the correlations and patterns within the data. Correlations between different data samples or neighboring regions can provide valuable information for data restoration and enhancement.

To address this limitation, correlation-based methods have been explored in the context of data restoration. These methods leverage the correlations and similarities between data samples to predict missing or corrupted information. For example, non-local means filtering and block-matching and 3D filtering (BM3D) have been widely used for image denoising by exploiting self-similarities within an image.

What is needed is an efficient and effective system and method that combine the benefits of multi-layer autoencoders and correlation-based techniques for data compression and restoration. Such an architecture should be capable of learning hierarchical representations, exploiting correlations within the data, and achieving high compression ratios while preserving important information. The present invention addresses these challenges by introducing a multi-layer autoencoder with a correlation layer. The proposed architecture leverages the power of deep learning to learn compact representations of data while explicitly modeling and utilizing correlations for enhanced data restoration. By incorporating a correlation layer within the autoencoder framework, the invention aims to achieve state-of-the-art performance in data compression and restoration tasks.

SUMMARY OF THE INVENTION

Accordingly, the inventor has conceived and reduced to practice, system and method for continuous and infinite video zoom using hierarchical and Lorentzian autoencoders. The invention comprises two main components: a multi-level autoencoder for compression and a correlation network for restoration. The multi-level autoencoder consists of an encoder and a decoder. The encoder compresses an input image into a compact representation, while the decoder reconstructs the image from the compressed representation. The architecture of the autoencoder can include convolutional layers, pooling layers, and activation functions. The correlation network may be trained on sets of compressed data sets to learn correlations between them. It takes the compressed representations as input and outputs restored versions of the images. The architecture of the correlation network may include convolutional layers and activation functions. During training, the autoencoder and correlation network may be optimized jointly using loss functions that measure the reconstruction quality and the restoration quality, respectively. The training process may involve forward passes through both networks, calculating losses, and updating the network parameters using optimization algorithms.

According to a preferred embodiment, A computer system comprising: a hardware memory, wherein the computer system is configured to execute software instructions stored on nontransitory machine-readable storage media that: compress video data into multi-level hierarchical representations preserving spatiotemporal relationships at different scales; receive user zoom instructions specifying a region of interest and a magnification level; generate synthetic visual details for regions beyond original video resolution when zooming in, or expand visual field with contextually appropriate content when zooming out; apply neural refinement to ensure visual coherence and consistency between original and generated content; render the video with transitions between original and generated content as zoom level changes; and maintain temporal consistency across video frames during continuous zoom operations, is disclosed.

According to another preferred embodiment, A method for compressing and restoring data, comprising the steps of: compressing video data into multi-level hierarchical representations preserving spatiotemporal relationships at different scales; receiving user zoom instructions specifying a region of interest and a magnification level; generating synthetic visual details for regions beyond original video resolution when zooming in, or expanding visual field with contextually appropriate content when zooming out; applying neural refinement to ensure visual coherence and consistency between original and generated content; rendering the video with transitions between original and generated content as zoom level changes; and maintaining temporal consistency across video frames during continuous zoom operations, is disclosed.

According to an aspect of an embodiment, the video data is compressed by a plurality encoders within a plurality of hierarchical autoencoders.

According to an aspect of an embodiment, the video data is decompressed by a plurality of decoders within the plurality of hierarchical autoencoders.

According to an aspect of an embodiment, the video data is compressed by a plurality of Lorentzian autoencoders.

According to an aspect of an embodiment, the video data is decompressed by a plurality of Lorentzian autoencoders.

BRIEF DESCRIPTION OF THE DRAWING FIGURES

FIG. 6 is a flow diagram illustrating an exemplary method for compressing a data input using a system for compressing and restoring data using multi-level autoencoders and correlation networks.

FIG. 9 is a flow diagram illustrating an exemplary method for compressing and decompressing IoT sensor data using a system for compressing and restoring data using multi-level autoencoders and correlation networks.

FIG. 15 is a flow diagram illustrating an exemplary method for compressing and restoring data using hierarchical autoencoders and correlation networks.

FIG. 18 is a flow diagram illustrating an exemplary method for compressing and restoring video data using Lorentzian autoencoders.

FIG. 19 is a flow diagram illustrating an exemplary method for implementing infinite zoom capability using hierarchical Lorentzian representations.

FIG. 22 is a flow diagram illustrating an exemplary method for implementing continuous zoom in video using hierarchical Lorentzian representations.

FIG. 23 is a flow diagram illustrating an exemplary method for bidirectional zoom using generative AI and Lorentzian autoencoders.

DETAILED DESCRIPTION OF THE INVENTION

Figure 1:
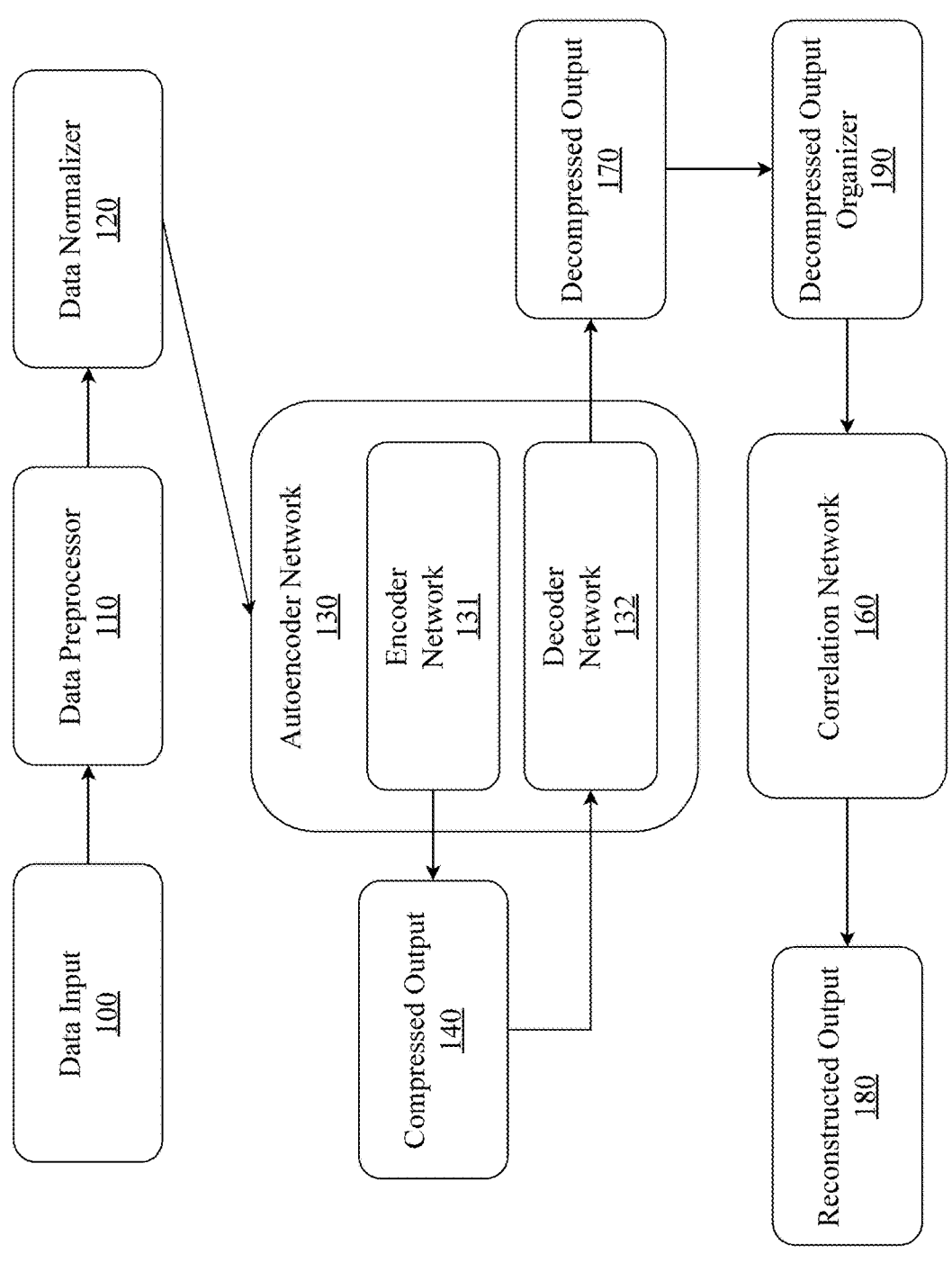
FIG. 1 is a block diagram illustrating an exemplary system architecture for compressing and restoring data using multi-level autoencoders and correlation networks.

The inventor has conceived, and reduced to practice, system and method for continuous and infinite video zoom using hierarchical and Lorentzian autoencoders.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 20:
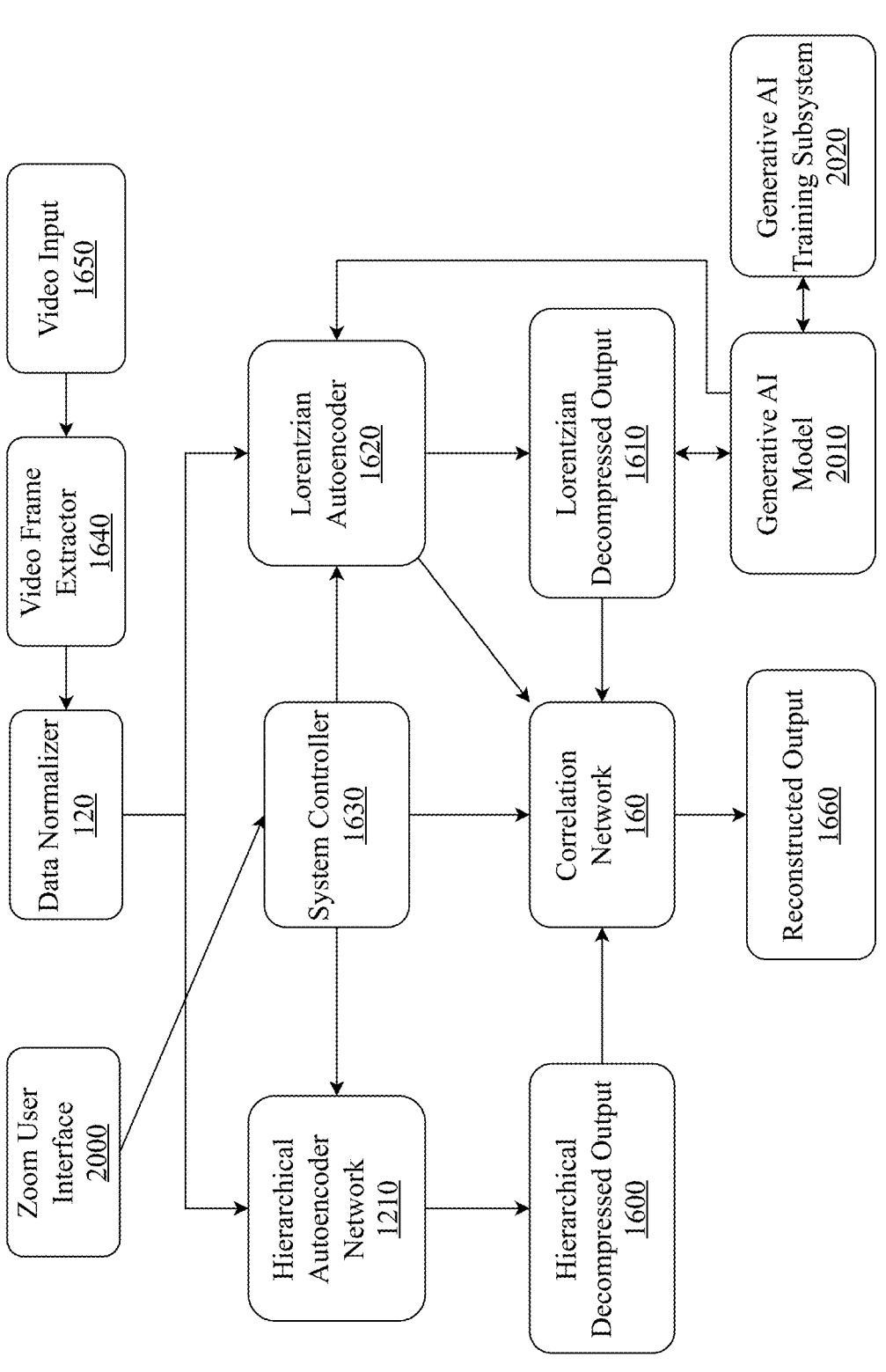
FIG. 20 is a block diagram illustrating an exemplary system architecture for video-focused compression with enhanced continuous zoom capabilities.

FIG. 20 is a block diagram illustrating an exemplary system architecture for video-focused compression with enhanced continuous zoom capabilities. The system combines traditional compression techniques with generative AI to enable seamless infinite zoom functionality across multiple scales.

The system begins with a video input 1650 which provides the source video content for processing. This video input may include various forms of video content such as movies, sports broadcasts, documentaries, surveillance footage, or other video media that would benefit from interactive zoom capabilities. The video input is processed by a video frame extractor 1640 which segments the incoming video stream into appropriate units for processing, extracting frames and organizing them into three-dimensional tensors where the first two dimensions represent spatial information and the third dimension represents time, preserving spatiotemporal relationships necessary for continuous zoom operations.

The extracted video frames are then passed to a data normalizer 120 which standardizes the data to consistent ranges and scales. This normalization ensures that different video sources with varying characteristics can be processed effectively by the neural networks in subsequent stages, maintaining consistency when zooming across different lighting conditions or visual styles.

For traditional data processing, the system employs a hierarchical autoencoder network 1210 which processes data through multiple levels of abstraction, capturing features at different scales and resolutions. This hierarchical approach enables multi-resolution representation that supports zooming by providing appropriate levels of detail at different magnification levels, producing a hierarchical decompressed output 1600 that preserves the multi-scale nature of the original content.

For video-specific processing, the system utilizes a Lorentzian autoencoder 1620 which maintains the tensor structure throughout the compression process. This specialized autoencoder preserves spatiotemporal relationships by applying 3D convolutional operations directly to the video tensor structure, ensuring that motion patterns, temporal continuity, and spatial coherence are maintained during zoom operations at any magnification level. Lorentzian autoencoder produces a Lorentzian decompressed output 1610 that retains the essential structural information needed for high-quality restoration and infinite zoom capabilities.

A system controller 1630 coordinates operations between the different processing components, managing compression parameters, quality settings, and zoom functionality. System controller receives input from a zoom user interface 2000 which allows users to interactively select regions of interest and specify desired magnification levels. For example, in a sports broadcast application, a user might start with a wide view of the field, zoom in to focus on a particular play, and continue zooming to see intricate details of player interactions that weren't clearly visible in the original video frame.

The system employs a generative AI model 2010 which works in conjunction with the Lorentzian autoencoder to generate plausible visual details beyond the resolution of the original video. When a user zooms into a region beyond the original resolution, the generative AI model synthesizes new details based on learned patterns and contextual information. For instance, when zooming into a historical battle scene, the generative AI might generate historically accurate uniform details, weapon characteristics, and environmental elements based on the context of the scene and historical reference data.

A generative AI training subsystem 2020 provides continuous improvement of the generative capabilities through specialized training on diverse video content. This training subsystem ensures that the generative components can produce realistic and contextually appropriate details across a wide range of video scenarios and zoom levels, learning to simulate plausible fine details for both zoom-in operations and broader contextual elements for zoom-out operations.

Both the hierarchical decompressed output and Lorentzian decompressed output are enhanced by a correlation network 160 which analyzes patterns and relationships between different aspects of the decompressed data. The correlation network exploits temporal and spatial patterns to recover information that might have been lost during compression, enhancing the continuity and realism of video as users navigate through different zoom levels.

The final stage of the system produces a reconstructed output 1660 which represents the fully processed and restored video data, with seamless integration of both compressed/decompressed original content and generatively enhanced details. This reconstructed output enables bidirectional continuous zoom experiences where users can explore video content at any scale, from wide panoramic views (zooming out from the original frame) to extreme close-ups (zooming in beyond original resolution), with smooth transitions between scales and consistent visual quality throughout the zoom range.

In practical implementation, this architecture enables applications such as virtual tourism where viewers can start with a landscape view and zoom in to explore architectural details or cultural artifacts; educational documentaries where students can examine scientific phenomena at progressively finer scales; and entertainment experiences where viewers can discover hidden details in scenes or explore contextual surroundings beyond the original frame, creating a more immersive and interactive viewing experience.

Figure 21:
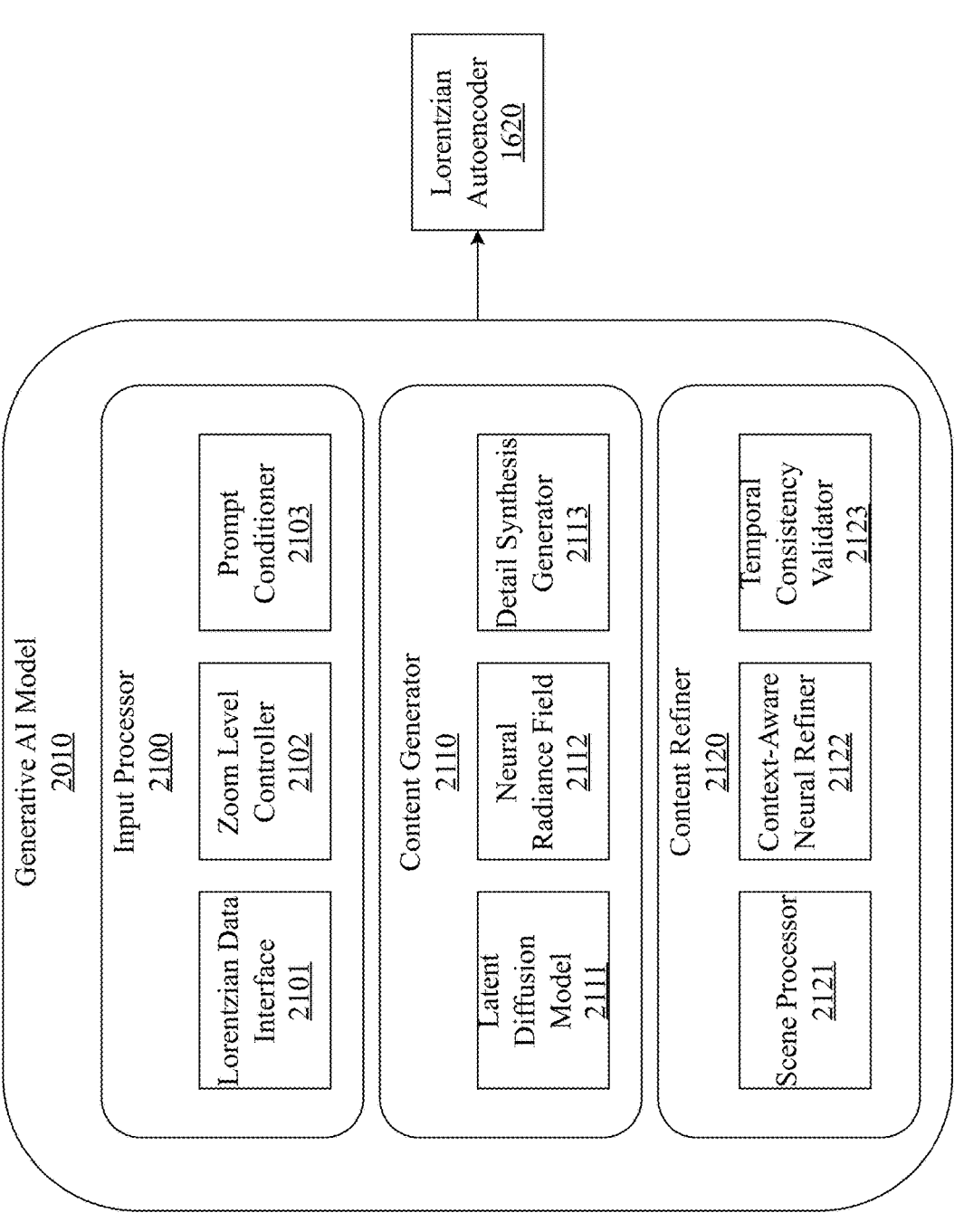
FIG. 21 is a block diagram illustrating an exemplary architecture for a subsystem of the system for video-focused compression with enhanced continuous zoom capabilities, a generative AI model.

FIG. 21 is a block diagram illustrating an exemplary architecture for a subsystem of the system for video-focused compression with enhanced continuous zoom capabilities, a generative AI model. The generative AI model is organized into three primary functional modules: an input processor 2100, a content generator 2110, and a content refiner 2120, each containing specialized components that work together to create a seamless zoom experience.

Input processor 2100 serves as the interface between the Lorentzian autoencoder system and the generative components. A Lorentzian data interface 2101 receives and interprets the mini-Lorentzian representations from Lorentzian autoencoder 1620, maintaining the tensor structure that preserves spatiotemporal relationships. This interface enables the generative AI model to understand the structured information embedded in the compressed video representations, preserving both spatial details and temporal coherence essential for realistic video zoom operations.

A zoom level controller 2102 manages user zoom requests and determines the appropriate detail level required for the current magnification. For example, when a user begins zooming into a landscape scene, the controller might first access available high-resolution data, then gradually transition to generatively created details as the zoom level exceeds the resolution of the original content. This component works closely with the user interface to interpret zoom gestures or commands and translate them into appropriate generation parameters.

A prompt conditioner 2103 enables contextual guidance of the generative process by incorporating metadata, scene information, or explicit user instructions. In a historical documentary application, this component might incorporate period-specific architectural styles or costume details to ensure historically accurate content generation when zooming into a scene. This conditioning allows for controlled generation that maintains thematic and stylistic consistency with the original content.

A content generator 2110 contains the core AI models responsible for synthesizing new visual elements at various zoom levels. A latent diffusion model 2111 generates high-fidelity details through iterative refinement processes, creating realistic textures and structures that extend beyond the resolution of the original video. For instance, when zooming into foliage in a nature documentary, the latent diffusion model might generate individual leaves with appropriate venation patterns and surface textures that weren't visible in the original footage.

A neural radiance field 2112 creates 3D-aware representations that enable more realistic zoom experiences by modeling how light interacts with surfaces in the scene. This component is particularly important for maintaining proper perspective, lighting, and depth cues as users zoom into a scene. Rather than simply magnifying pixels, the neural radiance field helps create a sense of navigating through three-dimensional space, revealing how surfaces and objects would actually appear when viewed from closer distances.

A detail synthesis generator 2113 specializes in creating fine visual elements appropriate to the specific zoom level and context. When zooming into a crowd scene, this generator might create plausible facial details for distant individuals or fabric textures on clothing that maintain consistency with the style and period of the original content. This component works closely with the other generation modules to ensure that newly synthesized details integrate seamlessly with existing content.

Content refiner 2120 ensures that generated content maintains coherence, consistency, and realism. The scene processor 2121 analyzes the overall scene context to ensure that generated details fit naturally within the broader visual environment. This component ensures that elements like lighting, color palette, and stylistic attributes remain consistent across different zoom levels and between original and generated content.

A context-aware neural refiner 2122 examines relationships between different visual elements to maintain logical coherence when generating new details. For example, when zooming into text on a sign, this component ensures that the generated text is contextually appropriate for the setting and maintains consistent language and typography. In a sports broadcast, it might ensure that generated details of players' uniforms maintain team-specific patterns and colors.

A temporal consistency validator 2123 verifies that generated details remain stable and coherent across consecutive frames, preventing distracting flickering or sudden changes when zooming while video is in motion. This is helpful for maintaining the illusion of continuous zoom in dynamic scenes, such as zooming into a moving vehicle while maintaining consistent details across frames.

Generative AI model 2010 connects bidirectionally with the Lorentzian autoencoder 1620, creating a feedback loop where compressed representations inform the generation process, and generated details can be integrated back into the compressed representation for consistent playback. This integration enables a unified experience where users can seamlessly zoom in to explore fine details or zoom out to gain contextual understanding, with generated content that maintains the visual quality and temporal coherence of the original video.

In practical applications, this architecture enables advanced features such as allowing viewers to zoom into background elements of a film scene to discover hidden details; enabling sports analysts to progressively zoom into player techniques with generated details that remain consistent with the original footage; or allowing educators to take students on virtual tours where they can continuously zoom from macro to micro scales while maintaining realistic detail at every level.

Figure 16:
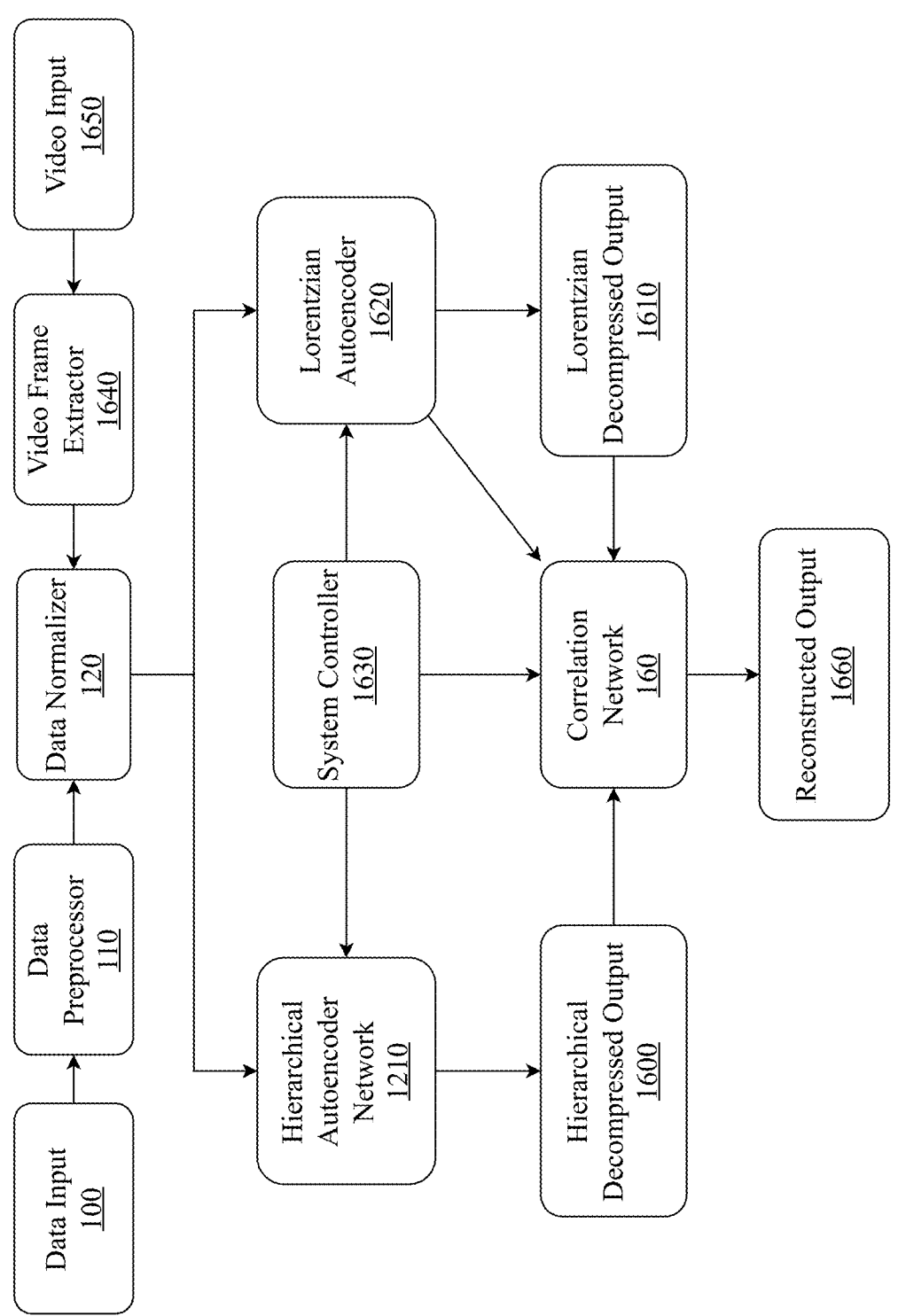
FIG. 16 is a block diagram illustrating an exemplary system architecture for video-focused compression with hierarchical and Lorentzian autoencoders.

FIG. 16 is a block diagram illustrating an exemplary system architecture for video-focused compression with hierarchical and Lorentzian autoencoders. The system combines traditional data processing capabilities with specialized video processing features to provide enhanced compression and restoration performance across multiple data types. The system comprises a data input 100 which receives general data for processing. This data input may include various forms of structured or unstructured data such as images, audio, text, or sensor readings. The data from data input 100 is passed to a data preprocessor 110 which performs initial preparation operations such as cleaning, formatting, and organizing the incoming data. Preprocessor 110 may implement different strategies depending on the data type, including but not limited to noise reduction, artifact removal, format conversion, and feature extraction. After preprocessing, the data proceeds to a data normalizer 120 which standardizes the data to consistent ranges and scales. Normalization is for ensuring that different data types and ranges can be processed effectively by the neural networks in subsequent stages. Data normalizer 120 may employ techniques such as but not limited to min-max scaling, z-score normalization, or other transformations appropriate to the specific data characteristics.

In parallel with the traditional data path, the system provides specialized processing for video content. A video input 1650 feeds video data into the system, which is then processed by a video frame extractor 1640. Video frame extractor 1640 segments the incoming video stream into appropriate units for processing, extracting frames and organizing them into three-dimensional tensors where the first two dimensions represent spatial information (height and width) and the third dimension represents time. This organization preserves the spatiotemporal relationships within the video data, which is useful for the Lorentzian processing approach. The output from video frame extractor 1640 is also passed to data normalizer 120, ensuring that the video data is appropriately scaled and prepared for subsequent processing stages. From data normalizer 120, the prepared data can follow one of two main processing paths depending on its nature and the required compression approach.

For general data, the system employs a hierarchical autoencoder network 1210 which processes data through multiple levels of abstraction, capturing features at different scales and resolutions. Hierarchical autoencoder network 1210 implements a multi-level compression approach, with each level focusing on features of different scales, from coarse to fine-grained. Each level in the hierarchy operates as a distinct encoding and decoding layer, where the output of one level serves as input to the next. The coarsest level captures global structure and overall patterns, while subsequent levels progressively preserve finer details and local features. This cascade of processing enables efficient representation of data with varying complexity across different spatial regions.

For video data specifically, the system utilizes a Lorentzian autoencoder 1620 which maintains the tensor structure throughout the compression process. Lorentzian autoencoder 1620 is specialized for processing three-dimensional tensors where the dimensions represent height, width, and time. Unlike traditional approaches that flatten frames into vectors or process them separately, Lorentzian autoencoder 1620 preserves spatiotemporal relationships by applying 3D convolutional operations directly to the tensor structure.

This preserves motion patterns, temporal continuity, and spatial coherence that would otherwise be lost during compression. The mini-Lorentzian representation produced by the encoder maintains this tensor format but with reduced dimensions, allowing for efficient storage while retaining the essential structural information needed for high-quality restoration. This tensor-based approach supports advanced features such as temporal prediction and infinite zoom capabilities, where the system can synthesize plausible details beyond the original video resolution.

Both autoencoder systems are monitored and controlled by a system controller 1630 which coordinates operations between the different processing components. System controller 1630 manages compression parameters, quality settings, processing priorities, and other operational aspects of the autoencoders. It also facilitates the implementation of advanced features such as infinite zoom capability by coordinating the appropriate processing levels and resources. After processing through their respective autoencoders, the data produces two types of decompressed outputs: hierarchical decompressed output 1600 from the hierarchical autoencoder network, and Lorentzian decompressed output 1610 from the Lorentzian autoencoder. These outputs represent restored versions of the original inputs but may still contain artifacts or information loss from the compression process.

To further enhance the quality of restoration, both decompressed outputs are passed to a correlation network 160. Correlation network 160 analyzes relationships and patterns between different aspects of the decompressed data, leveraging cross-correlations to recover information that might have been lost during compression. For video data, correlation network 160 can exploit temporal and spatial patterns to predict and restore missing details. Correlation network 160 may implement different strategies for different data types, with specialized processing for the tensor-structured outputs from Lorentzian autoencoder 1620. The final stage of the system produces a reconstructed output 1660 which represents the fully processed and restored data. This output combines the strengths of both autoencoder approaches and the enhancement capabilities of the correlation network, resulting in high-quality reconstructions that preserve essential information from the original inputs.

In operation, the system dynamically routes different types of data through the appropriate processing paths based on their characteristics. For example, video data would primarily flow through video frame extractor 1640 and Lorentzian autoencoder 1620 path, while other data types would be processed through hierarchical autoencoder network 1210. System controller 1630 continuously monitors and adjusts the processing parameters to optimize quality and efficiency. This integrated architecture enables several advanced capabilities, such as multi-modal data processing where the system can handle diverse data types through appropriate specialized pathways; enhanced video compression by maintaining tensor structure throughout the process, with Lorentzian autoencoder 1620 achieving better preservation of spatiotemporal relationships; infinite zoom functionality where the hierarchical representations and Lorentzian processing enable continuous zooming beyond original resolution by synthesizing plausible details at finer scales; and cross-domain correlation where the correlation network can leverage patterns across different data types and representations to enhance overall restoration quality. The system may be implemented on various computing platforms, including but not limited to cloud-based systems, edge devices, or specialized hardware accelerators. The specific implementation may vary based on the computational resources available and the requirements of the application domain.

Figure 17:
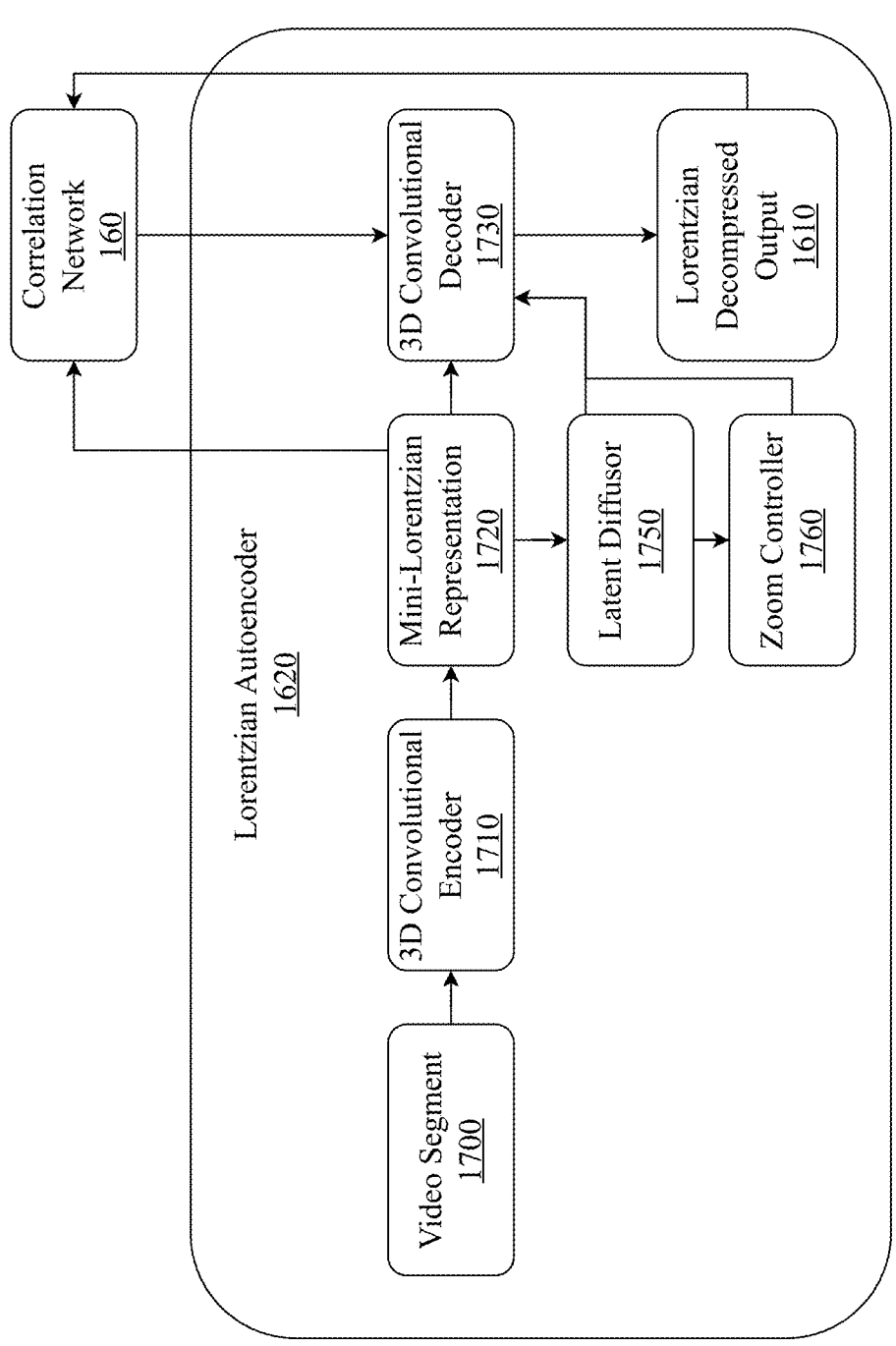
FIG. 17 is a block diagram illustrating an exemplary architecture for a subsystem of the system for video-focused compression with hierarchical and Lorentzian autoencoders, a Lorentzian autoencoder.

FIG. 17 is a block diagram illustrating an exemplary architecture for a subsystem of the system for video-focused compression with hierarchical and Lorentzian autoencoders, a Lorentzian autoencoder. Lorentzian autoencoder 1620 is designed for processing video data while preserving spatiotemporal relationships throughout the compression and restoration process. The autoencoder contains multiple specialized components that work together to achieve efficient compression and high-quality restoration of video content. The process begins with a video segment 1700 which serves as the input to Lorentzian autoencoder 1620. This video segment represents a sequence of video frames structured as a three-dimensional tensor, where the dimensions correspond to height, width, and time. The tensor format enables the system to process spatial and temporal information simultaneously, preserving important relationships that might be lost in traditional frame-by-frame processing approaches. The video segment may be extracted from a larger video stream by the video frame extractor 1640, with appropriate preprocessing and normalization applied before reaching the Lorentzian autoencoder.

Video segment 1700 is first processed by a 3D convolutional encoder 1710, which applies a series of three-dimensional convolutional operations to the input tensor. Unlike traditional two-dimensional convolutional networks that process images, 3D convolutional encoder 1710 operates across both spatial and temporal dimensions simultaneously. This approach allows the encoder to capture spatiotemporal patterns and dependencies within the video data. The 3D convolutional operations progressively reduce the dimensions of the input tensor while increasing the feature depth, effectively compressing the video data into a more compact representation. 3D convolutional encoder 1710 may employ various architectural elements such as pooling layers, activation functions, and skip connections to optimize the encoding process for different types of video content and compression requirements.

The output of the 3D convolutional encoder 1710 is a mini-Lorentzian representation 1720, which is a compressed version of the original video segment that maintains the tensor structure. The mini-Lorentzian representation preserves the three-dimensional nature of the original data but with reduced spatial and temporal dimensions and potentially increased feature channels. This compressed representation serves as the central element of Lorentzian autoencoder 1620, connecting to multiple subsequent processing components. The mini-Lorentzian representation 1720 maintains matrix and tensor structures in the latent space, rather than flattening to vectors as is common in traditional autoencoders. This structural preservation enables more effective modeling of complex relationships within the video data and supports advanced features such as infinite zoom capabilities.

From the mini-Lorentzian representation 1720, the data follows multiple paths within the autoencoder. One path leads to 3D convolutional decoder 1730, which is responsible for reconstructing the original video data from the compressed representation. 3D convolutional decoder 1730 performs operations that are essentially the inverse of the encoder, progressively expanding the spatial and temporal dimensions while reducing the feature depth. The decoder may employ transposed convolutions, upsampling operations, and other techniques to effectively reconstruct the video data from its compressed form. The decoder's architecture often mirrors that of the encoder, potentially with skip connections between corresponding encoder and decoder layers to preserve fine details that might otherwise be lost during compression.

Another path from mini-Lorentzian representation 1720 leads to latent diffusor 1750, which models and analyzes the dynamics of the latent space. The latent diffusor examines patterns and trajectories within the mini-Lorentzian representation to understand how features evolve over time. This component plays a role in temporal prediction and synthesis, enabling the system to generate coherent video content beyond what was explicitly encoded in the compressed representation. Latent diffusor 1750 provides information to 3D convolutional decoder 1730, enhancing its ability to reconstruct temporally consistent and visually plausible video sequences. Latent diffusor 1750 may incorporate recurrent neural network architectures, attention mechanisms, or other specialized components designed to capture temporal dependencies and patterns.

Mini-Lorentzian representation 1720 also connects to correlation network 160. Correlation network 160 can identify patterns and similarities across different compressed representations, enabling it to recover information that might have been lost during compression. The output from correlation network 160 flows back to the 3D convolutional decoder 1730, providing additional information that enhances the quality of the reconstructed video.

Latent diffusor 1750 connects to a zoom controller 1760, which manages the infinite zoom capability of the system. Zoom controller 1760 uses information about the latent space dynamics to generate additional details when zooming into specific regions of the video. By understanding the structured nature of the mini-Lorentzian representations across different scales, the zoom controller 1760 can direct the decoder to synthesize plausible fine details even beyond the resolution of the original video. Zoom controller 1760 also provides input to 3D convolutional decoder 1730, influencing how it reconstructs the video data based on the desired zoom level and region of interest.

The final output of Lorentzian autoencoder 1620 is a Lorentzian decompressed output 1610, which represents the restored video segment after all processing stages. This output maintains the tensor structure of the original input but with potentially enhanced quality due to the restoration capabilities of the various components within the autoencoder. Lorentzian decompressed output 1610 may then be further processed by the correlation network 160 as part of the broader system, where it can be integrated with outputs from the hierarchical autoencoder to produce the final reconstructed output. Lorentzian autoencoder 1620 architecture represents a significant advancement in video compression technology, enabling higher compression ratios while maintaining better visual quality and supporting advanced features such as infinite zoom. The preservation of tensor structure throughout the processing pipeline allows for more effective modeling of spatiotemporal relationships, resulting in superior compression and restoration performance compared to traditional approaches that process video frames independently or flatten the data to vectors in the latent space.

FIG. 1 is a block diagram illustrating an exemplary system architecture for compressing and restoring data using multi-level autoencoders and correlation networks. In one embodiment, a system for compressing and restoring data using multi-level autoencoders and correlation networks comprises a plurality of data inputs 100, a data preprocessor 110, a data normalizer 120, a multi-layer autoencoder network 130 which further comprises an encoder network 131 and a decoder network 132, a plurality of compressed outputs 140, plurality of decompressed outputs 170, a decompressed output organizer 190, a plurality of correlation networks 160, and a reconstructed output 180. The plurality of data inputs 100 are representations of raw data from various sources, such as sensors, cameras, or databases. The raw data can be in different formats, including but not limited to images, videos, audio, or structured data. The plurality of data inputs 100 may be transferred to the data preprocessor 110 for further processing. The data preprocessor 110 applies various preprocessing techniques to the raw data received from the data input 100. These techniques may include data cleaning, noise reduction, artifact removal, or format conversion. The preprocessor 110 ensures that the data is in a suitable format and quality for subsequent stages of the system.

The preprocessed data may then be passed to the data normalizer 120. The data normalizer 120 scales and normalizes the data to a consistent range, typically between 0 and 1. Normalization helps to improve the training stability and convergence of the autoencoder network 130. The normalized data is fed into the autoencoder network 130, which includes both the encoder network 131 and the decoder network 132. The encoder network 131 is responsible for encoding the input data into a lower-dimensional latent space representation. It consists of multiple layers of encoders that progressively reduce the dimensionality of the data while capturing the most important features and patterns.

The compressed latent representation obtained from the encoder network 131 is the compressed output 140. The compressed output 140 has a significantly reduced size compared to the original input data, enabling efficient storage and transmission. The compressed output 140 may be stored in a storage system. A storage system may can be any suitable storage medium, such as a database, file system, or cloud storage. Storage systems allow for the efficient management and retrieval or the compressed data as needed. When the compressed data needs to be restored or reconstructed, it may be retrieved from the storage system and passed to the decoder network 132. Additionally, the compressed data may be directly passed to either the decompression network 132. The decoder network 132 is responsible for decoding the compressed latent representation back into the original data space by outputting a decompressed output 170. It consists of multiple layers of decoders that progressively increase the dimensionality of the data, reconstructing the original input.

The decompressed output 170 from the encoder network 132 may have some loss of information compared to the original input data due to the compression process. To further enhance the quality of the decompressed output, the system may incorporate a correlation network 160. The correlation network 160 leverages the correlations and patterns between different compressed inputs to restore the decompressed output more accurately. It learns to capture the relationships and dependencies within the data, allowing for better reconstruction and restoration of the original information. The correlation network 160 takes the decompressed outputs 170 as inputs. It analyzes the correlations and similarities between the data samples and uses this information to refine and enhance the decompressed output. The refined decompressed output from the correlation network 160 is a reconstructed output 180 of the system. The reconstructed output 180 closely resembles the original input data, with minimal loss of information and improved quality compared to the output from the decoder network 132 alone.

In one embodiment, the correlation network 160 may receive inputs from a decompressed output organizer 190 which that operates on the decompressed outputs 170 obtained from the decoder network 132. The decompressed output organizer 190 may organize the decompressed outputs 170 into groups based on their correlations and similarities.

By grouping decompressed outputs 170 based on similarities, the correlation network 160 will more easily be able to identify correlations between decompressed outputs 170. The correlation network 160 finds patterns and similarities between decompressed outputs 170 to develop a more holistic reconstructed original input. By priming the correlation network 160 with already grouped, similar compressed outputs 170, the correlation network 160 will be able to generate even more reliable reconstructions. The multi-layer autoencoder network 130 and the correlation network 160 are trained using a large dataset of diverse samples. The training process involves minimizing the reconstruction loss between the original input data and the decompressed output 170. The system learns to compress the data efficiently while preserving the essential features and patterns.

Figure 2:
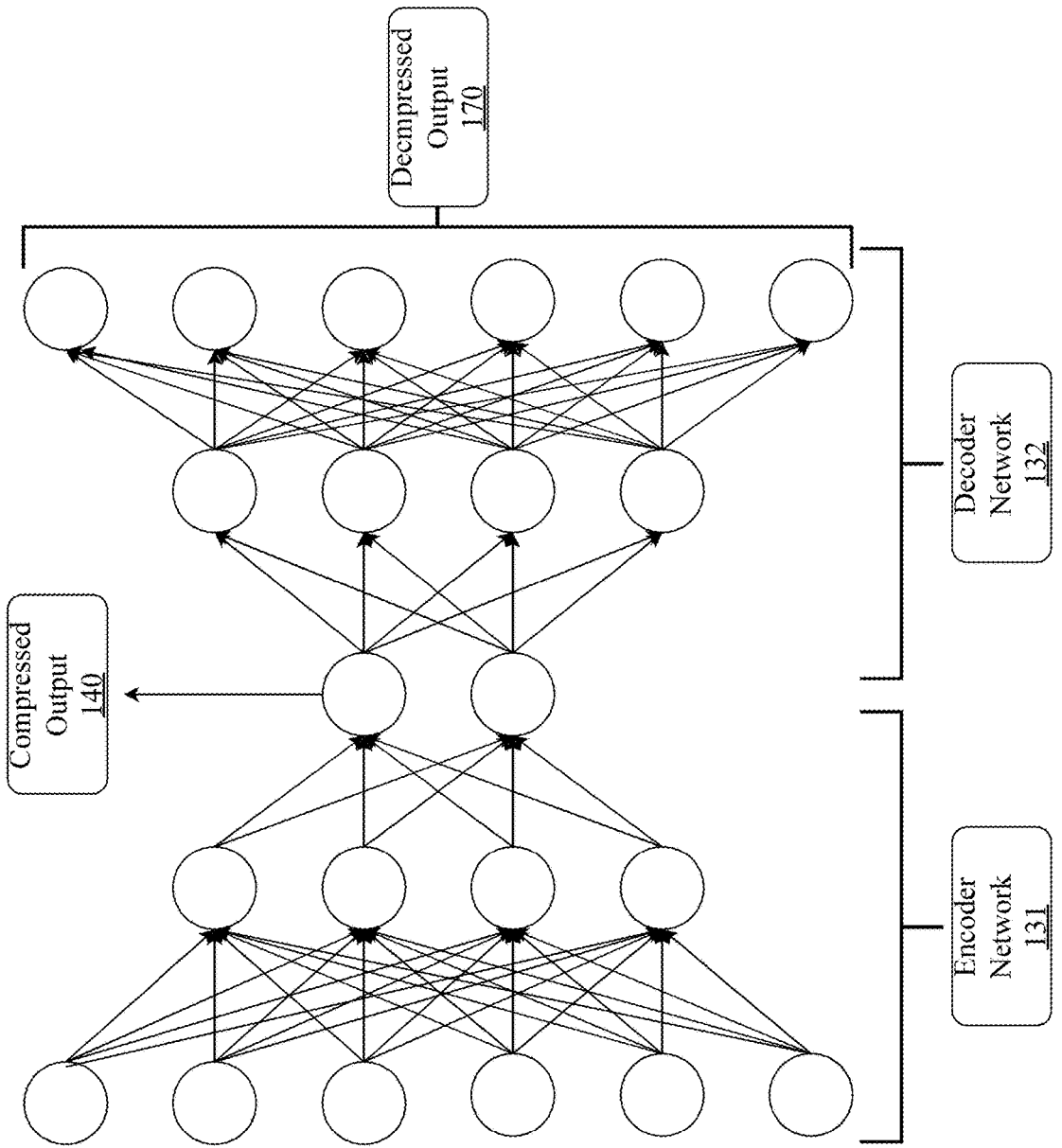
FIG. 2 is a block diagram illustrating an exemplary architecture for a subsystem of the system for compressing and restoring data using multi-level autoencoders and correlation networks, an autoencoder network.

FIG. 2 is a block diagram illustrating an exemplary architecture for a subsystem of the system for compressing and restoring data using multi-level autoencoders and correlation networks, a multi-layer autoencoder network. The multi-layer autoencoder network comprises an encoder network 131 or a decoder network 132 that work together to encode and decode data effectively. The encoder network 131 and decoder network 132 within the multi-layer autoencoder network 210 is comprised of a plurality of layers that contribute to the encoding and decoding process. These layers include, but are not limited to, convolutional layers, pooling layers, and a bottleneck layer. Some embodiments also include functions that operate on information including but not limited to rectified linear unit functions, sigmoid functions, and skip connections.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations.

They also promote sparsity and alleviate the vanishing gradient problem. The bottleneck layer represents the most compressed representation of the input data. The bottleneck layer has a significantly reduced dimensionality compared to the input and output layers of the autoencoder. It forces the network to learn a compact and meaningful encoding of the data, capturing the essential features and discarding redundant information. In one embodiment, the multi-layer autoencoder network is comprised of a plurality of the previously mentioned layers where the sequence and composition of the layers may vary depending on a user's preferences and goals. The bottleneck layer is where the compressed output 140 is created. Each layer previous to the bottleneck layer creates a more and more compressed version of the original input. The layers after the bottleneck layer represent the decoder network 132 where a plurality of layers operate on a compressed input to decompress a data set. Decompression results in a version of the original input which is largely similar but has some lost data from the transformations.

Figure 3:
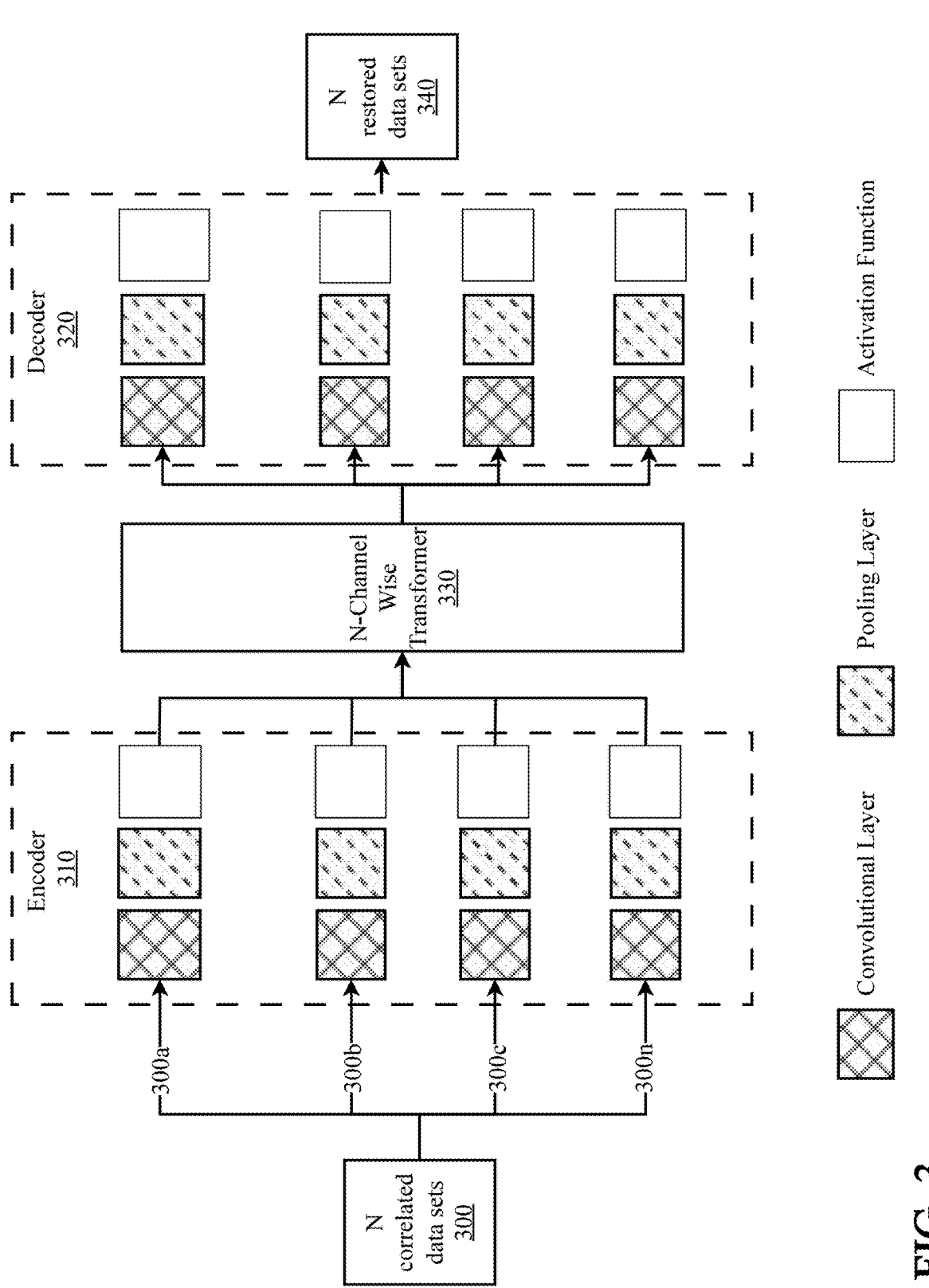
FIG. 3 is a block diagram illustrating an exemplary architecture for a subsystem of the system for compressing and restoring data using multi-level autoencoders and correlation networks, a correlation network.

FIG. 3 is a block diagram illustrating an exemplary architecture for a subsystem of the system for compressing and restoring data using multi-level autoencoders and correlation networks, a correlation network. The correlation network 160 is designed to enhance the reconstruction of decompressed data by leveraging correlations and patterns within the data. The correlation network 160 may also be referred to as a neural upsampler. The correlation network 160 comprises a plurality of correlation network elements that work together to capture and utilize the correlations for improved data reconstruction. Each correlation network element within the correlation network 160 contributes to the correlation learning and data reconstruction process. These elements include, but are not limited to, convolutional layers, skip connections, pooling layers and activation functions such as but not limited to, rectified linear unit functions or sigmoid functions.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem.

In one embodiment, the correlation network 160 may comprise an encoder 310, a decoder 320, an N number of correlated data sets 300, an N number-channel wise transformer 330, and an N number of restored data sets 340. Additionally, the correlation network 160 may be comprised of a plurality of convolutional layers, pooling layers, and activation functions. In one embodiment, the correlation network 160 may be configured to receive N correlated data sets 300 where each correlated data set includes a plurality of decompressed data points. In one embodiment, the correlation network 160 may be configured to receive four correlated data sets as an input. The correlated data sets may have been organized by a decompressed output organizer 170 to maximize the similarities between the data points in each set. One data set, 300, may include data points 300$a$, 300$b$, 300$c$, through 300$n$, where the decompressed output organizer 170 has determined the N number of data points are similar enough to be grouped together. The correlation network 160 may then receive and process full data sets at a time. In FIG. 3, the data is processed through an encoder 310 by passing through a convolutional layer, a pooling layer, and an activation function.

Activation functions introduce non-linearity into the network, enabling it to learn and represent complex patterns and relationships in the data. Common activation functions include but are not limited to sigmoid, tanh, ReLU (Rectified Linear Unit), and its variants. These functions have different properties and are chosen based on the specific requirements of the task and the network architecture. For example, ReLU is widely used in deep neural networks due to its ability to alleviate the vanishing gradient problem and promote sparsity in the activations. By applying activation functions, the neural network can learn capture non-linear relationships in the data, enabling it to model complex patterns and make accurate predictions or decisions.

The encoder 310 breaks the decompressed outputs passed by the decompressed output organizer 170 down into smaller representations of the original data sets. Following the encoder the data may pass through a transformer 330. A transformer is a type of neural network architecture that may rely on a self-attention mechanism which allows the model to weigh the importance of different parts of the input sequence when processing each element. This enables the transformer to capture dependencies and relationships between elements in the sequence efficiently. After being processed by a transformer 330, the data sets may be further processed by a decoder 320 which restores the smaller representations back into the original decompressed data sets. The decoder 320 may have a similar composition as the encoder 310, but reversed, to undo the operations performed on the data sets by the encoder 310. The transformer 330 may identify important aspects in each group of decompressed data passed through the correlation network which allows the decoder 320 to rebuild a more complete version of the original decompressed data sets. The decoder 320 may output an N number of restored data sets 340 which correspond to the N number of correlated data sets 300 originally passed through the correlation network 170.

Figure 4:
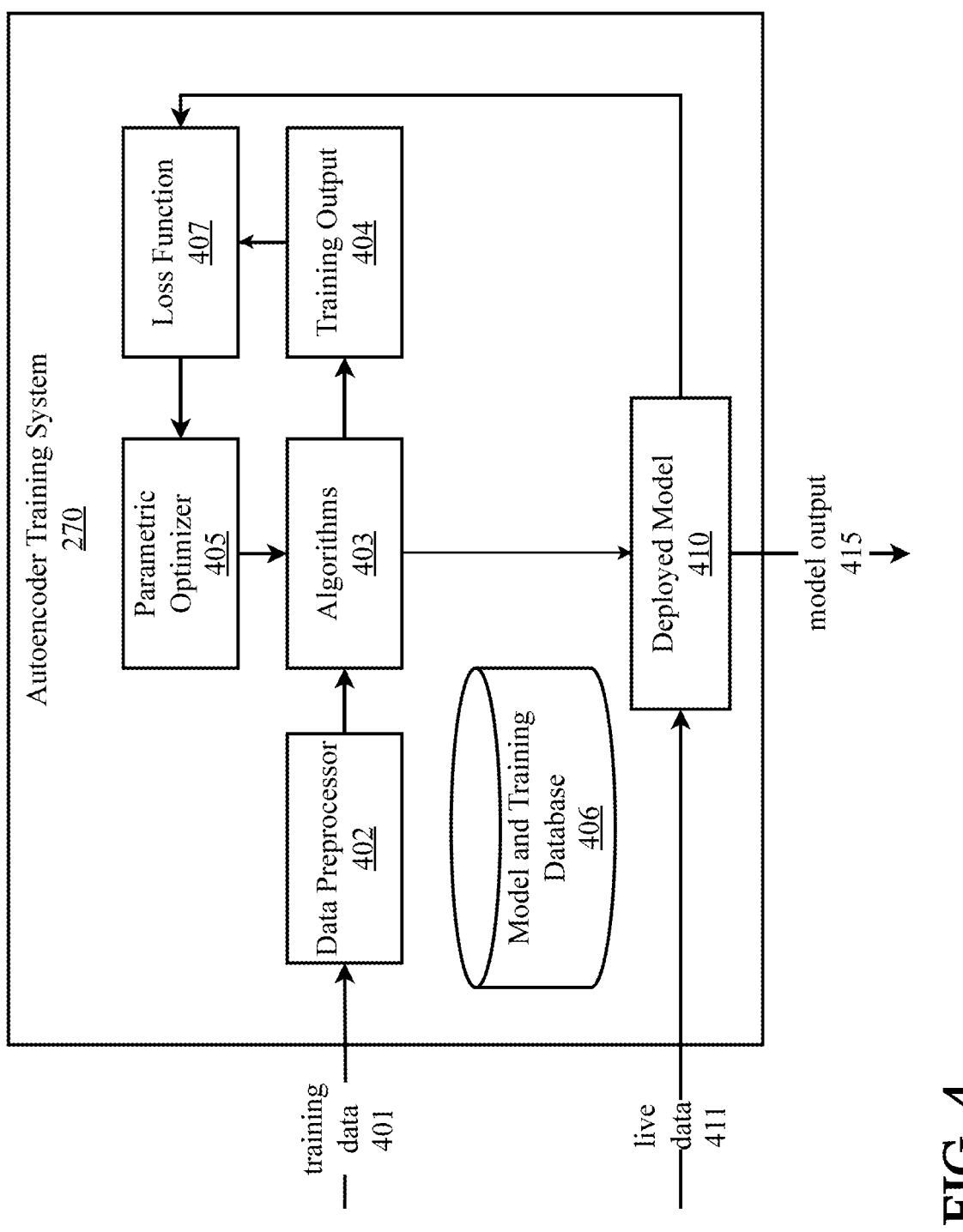
FIG. 4 is a block diagram illustrating an exemplary architecture for a subsystem of the system for compressing and restoring data using multi-level autoencoders and correlation networks, an autoencoder training system.

FIG. 4 is a block diagram illustrating an exemplary aspect of a platform for a subsystem of the system for compressing and restoring data using multi-level autoencoders and correlation networks, an autoencoder training system 270. According to the embodiment, the autoencoder training system 270 may comprise a model training stage comprising a data preprocessor 402, one or more machine and/or deep learning algorithms 403, training output 404, and a parametric optimizer 405, and a model deployment stage comprising a deployed and fully trained model 410 configured to perform tasks described herein such as transcription, summarization, agent coaching, and agent guidance. Autoencoder training system 270 may be used to train and deploy the multi-layer autoencoder network 210 in order to support the services provided by the compression and restoration system.

At the model training stage, a plurality of training data 401 may be received at the autoencoder training system 270. In some embodiments, the plurality of training data may be obtained from one or more storage systems 150 and/or directly from various information sources. In a use case directed to hyperspectral images, a plurality of training data may be sourced from data collectors including but not limited to satellites, airborne sensors, unmanned aerial vehicles, ground-based sensors, and medical devices. Hyperspectral data refers to data that includes wide ranges of the electromagnetic spectrum. It could include information in ranges including but not limited to the visible spectrum and the infrared spectrum. Data preprocessor 402 may receive the input data (e.g., hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 403 to train a predictive model for object monitoring and detection.

During model training, training output 404 is produced and used to measure the quality and efficiency of the compressed outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the autoencoder training system 270 to evaluate a model's performance. Metrics can include, but are not limited to, compression ratio, the amount of data lost, the size of the compressed file, and the speed at which data is compressed, to name a few. In one embodiment, the system may utilize a loss function 407 to measure the system's performance. The loss function 407 compares the training outputs with an expected output and determined how the algorithm needs to be changed in order to improve the quality of the model output. During the training stage, all outputs may be passed through the loss function 407 on a continuous loop until the algorithms 403 are in a position where they can effectively be incorporated into a deployed model 415.

The test dataset can be used to test the accuracy of the model outputs. If the training model is compressing or decompressing data to the user's preferred standards, then it can be moved to the model deployment stage as a fully trained and deployed model 410 in a production environment compressing or decompressing live input data 411 (e.g., hyperspectral data). Further, model compressions or decompressions made by deployed model can be used as feedback and applied to model training in the training stage, wherein the model is continuously learning over time using both training data and live data and predictions.

A model and training database 406 is present and configured to store training/test datasets and developed models. Database 406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.). In some implementations, the autoencoder training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 406.

Figure 5:
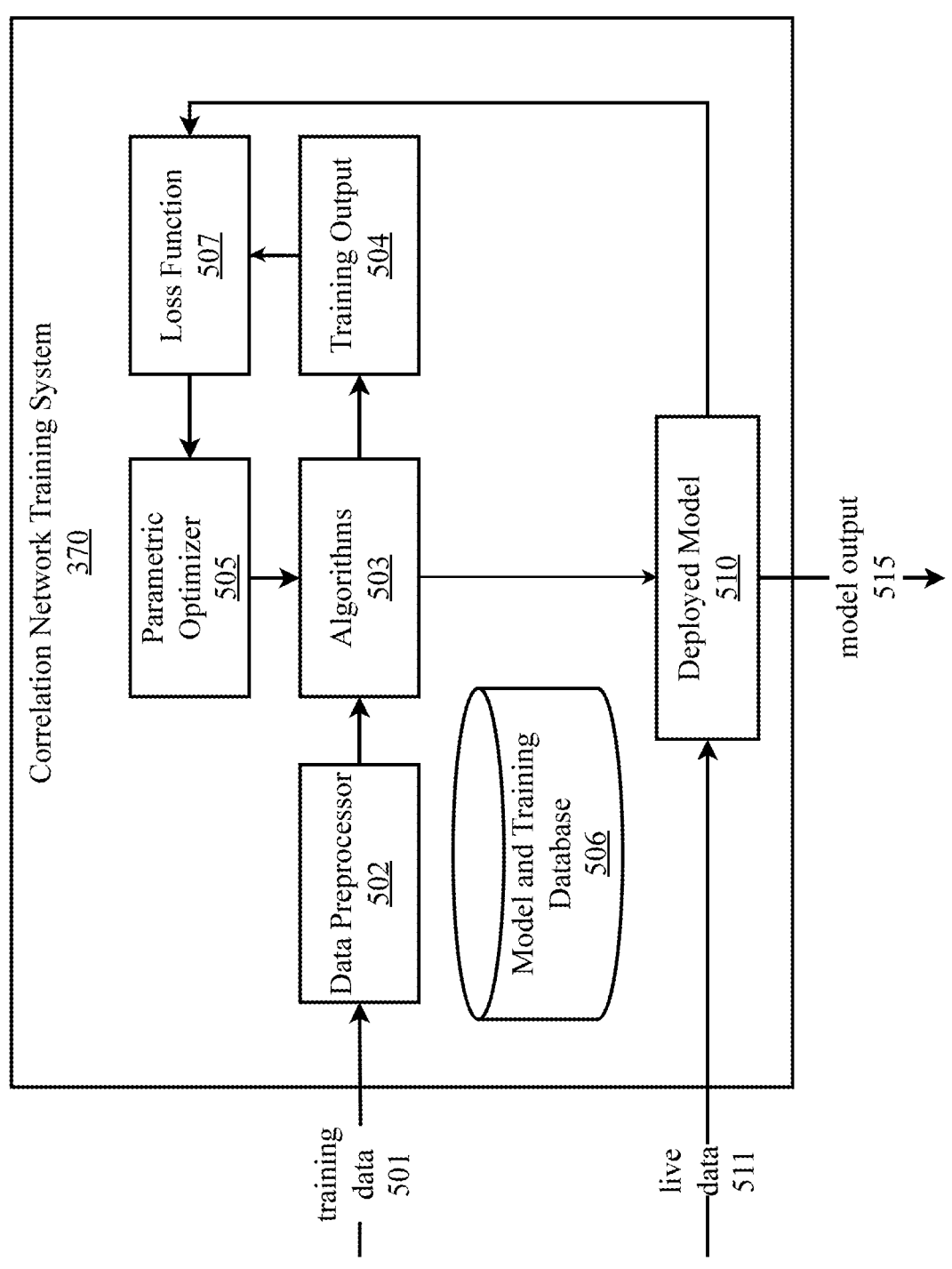
FIG. 5 is a block diagram illustrating an exemplary architecture for a subsystem of the system for compressing and restoring data using multi-level autoencoders and correlation networks, correlation network training system.

FIG. 5 is a block diagram illustrating an exemplary aspect of a subsystem of the system for compressing and restoring data using multi-level autoencoders and correlation networks, a correlation network training system 370. According to the embodiment, correlation network training system 370 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such determining correlations between compressed data sets. The correlation network training system 370 may be used to train and deploy the correlation network 300 in order to support the services provided by the compression and decompression system.

At the model training stage, a plurality of training data 501 may be received by the correlation network training system 500. In some embodiments, the plurality of training data may be obtained from one or more storage systems 150 and/or directly from the compression network 131. In some embodiments, the correlation network training system may obtain data sets from a vector grouping system 180. In a use case directed to hyperspectral data sets, a plurality of decompressed training data may be sourced from a hyperspectral data compression system. Data preprocessor 502 may receive the input data (e.g., decompressed hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 400 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 507 to measure the system's performance. The loss function 507 compares the training outputs with an expected output and determined how the algorithm needs to be changed in order to improve the quality of the model output. During the training stage, all outputs may be passed through the loss function 507 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., compressed hyperspectral data). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the correlation network training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

Detailed Description of Exemplary Aspects

FIG. 22 is a flow diagram illustrating an exemplary method for implementing continuous zoom in video using hierarchical Lorentzian representations. In a first step 2200, a video input is organized into sequential segments represented as three-dimensional tensors with spatial and temporal dimensions. This initial organizational step involves partitioning the incoming video stream into manageable units for processing by the Lorentzian autoencoder system. The segmentation may be performed based on various criteria such as scene changes, fixed time intervals, or content characteristics. Each segment is structured as a three-dimensional tensor where the first two dimensions represent spatial information (height and width), and the third dimension represents time (sequence of frames). For example, in a satellite imagery application, a continuous video feed might be divided into 5-second segments, each containing 150 frames at 30 frames per second, with spatial dimensions corresponding to the camera resolution. This tensor structure preserves the spatial and temporal relationships within each video segment, which is essential for maintaining continuity during zoom operations.

In a step 2210, each video segment is compressed using a Lorentzian autoencoder to create multi-level representations at different scales of detail. The Lorentzian autoencoder employs a hierarchical approach to compression, generating representations at multiple resolutions or scales rather than a single compressed format. This multi-level compression process involves a cascade of encoding operations, each focused on capturing features at different levels of detail. For instance, in a medical imaging application, the first level might capture the overall structure of an organ, the second level might represent tissue boundaries, and the third level might preserve cellular details. The Lorentzian autoencoder maintains the tensor structure throughout this hierarchical compression, ensuring that spatiotemporal relationships are preserved at each scale to support seamless zooming operations.

In a step 2220, a hierarchical latent structure is generated that preserves spatial and temporal relationships at multiple resolution levels. This hierarchical structure organizes the compressed representations in a way that maintains their relationships across different scales, facilitating efficient zoom operations. The structure may implement various data hierarchies such as pyramidal representations or other schemes that explicitly encode the connections between different resolution levels. This organization ensures that when a user zooms into a specific region, the system can efficiently access the appropriate level of detail from the stored representations and provide a coherent transition between resolution levels.

In a step 2230, zoom instructions are received from a user interface specifying a region of interest and desired magnification level. This interactive step involves capturing user input regarding which part of the video they wish to examine more closely and how much they want to magnify it. The user interface may provide various input mechanisms such as mouse controls, touch gestures, or explicit numerical inputs for specifying the zoom parameters. For example, in a sports video analysis application, a coach might use a bounding box to select a specific player and request a 4× magnification to examine their technique in greater detail. The zoom instructions include both spatial information (the selected region of interest) and scale information (the desired magnification level).

In a step 2240, the latent representations are processed through a generative AI model to synthesize additional scene details beyond the original resolution. When the requested zoom level exceeds the detail available in the original video, the generative AI model creates plausible new details based on learned patterns and contextual understanding. For example, when zooming into a historical battlefield scene, the generative AI might create details of uniforms, weapons, and facial expressions that weren't visible in the original footage but are consistent with the historical context and visual style. The generative model uses the hierarchical latent representations as a foundation, extending them with synthesized details that maintain visual consistency with the original content.

In a step 2250, context-aware neural refinement is applied to ensure visual coherence and consistency in the generated content. This refinement process examines the generated details in relation to their surrounding context, verifying that they maintain appropriate style, lighting, texture, and logical consistency with the scene. For instance, when generating details of text on a distant sign, the refinement process ensures that the text style matches the era and location of the scene, and that the text content is logically consistent with the surrounding environment. This step is crucial for maintaining the illusion that zoomed details were captured in the original footage rather than generated artificially.

In a step 2260, the selected region is rendered with progressively enhanced detail, seamlessly blending recorded and synthesized information for a continuous zoom experience. This rendering process combines multiple levels of detail, including both the stored representations and the newly synthesized details, into a coherent visual output. The rendering employs sophisticated blending techniques to create smooth transitions between different levels of detail and between recorded and synthesized content. For instance, in a virtual tourism application, as a user zooms into architectural details of a historical building, the system would smoothly blend from the recorded overview to increasingly detailed views, with synthesized fine details appearing naturally as the zoom continues.

In a step 2270, the video display is updated in real-time while maintaining temporal coherence across frames as zoom levels change. This step ensures that the continuous zoom experience remains fluid even as the video content changes over time. The system maintains consistent generation of details across consecutive frames, preventing visual artifacts such as flickering or sudden changes in generated content. For example, when zooming into a flowing river while the video plays, the system ensures that the generated water ripple details remain consistent with the motion of the water across frames, creating a natural and immersive zoom experience. This real-time updating allows users to explore video content dynamically, zooming in and out while the video continues to play, without disrupting the temporal coherence of the scene.

This method enables capabilities for video exploration, allowing users to zoom continuously into any part of a video scene beyond the original resolution constraints. Applications include entertainment platforms where viewers can discover hidden details in movie scenes; educational systems where students can explore scientific phenomena across multiple scales; and professional tools for forensic analysis, medical imaging, or sports performance review where detailed examination of specific regions is essential.

FIG. 23 is a flow diagram illustrating an exemplary method for bidirectional zoom using generative AI and Lorentzian autoencoders. In a first step 2300, a video segment is extracted from a video input, forming a three-dimensional tensor where spatial and temporal relationships are preserved. This initial step involves isolating a manageable portion of video data for processing, typically consisting of a sequence of frames. The extraction process may involve techniques such as sliding windows over the video stream, scene detection for natural segmentation, or fixed-interval partitioning. For example, in a high-definition video streaming application, the system might extract segments of 30 frames (1 second at 30 fps) with spatial dimensions of 1920×1080 pixels, forming a tensor of shape [1920, 1080, 30, 3] where the last dimension represents the RGB color channels. The three-dimensional tensor structure is essential for preserving the spatiotemporal relationships within the video data, allowing the system to model both spatial patterns and temporal dynamics simultaneously for seamless bidirectional zoom operations.

In a step 2310, the three-dimensional tensor is processed through a Lorentzian autoencoder to produce a compact mini-Lorentzian representation. The Lorentzian autoencoder employs specialized 3D convolutional neural networks that operate across both spatial and temporal dimensions. Unlike traditional autoencoders that might flatten video frames into vectors, the Lorentzian autoencoder maintains the tensor structure throughout the encoding process, preserving essential spatiotemporal relationships. This step involves a series of 3D convolutional operations, potentially with pooling layers and non-linear activations that progressively reduce the dimensions of the input tensor while extracting relevant features. For instance, the original [1920, 1080, 30, 3] tensor might be compressed to a mini-Lorentzian representation of shape [240, 135, 10, 64], significantly reducing the data size while maintaining the tensor structure necessary for high-quality bidirectional zoom operations.

In a step 2320, the latent space dynamics are analyzed using a diffusion engine to understand patterns of detail across different scales. This analytical step examines how features and patterns in the latent space vary across different resolution levels and how they evolve over time. The diffusion engine employs specialized neural network architectures designed to model transitions between different scales of detail. It learns how features at coarser scales relate to and predict features at finer scales, enabling more effective synthesis of high-resolution details during zoom-in operations. Similarly, it learns how features at finer scales can be aggregated into coherent representations at coarser scales for zoom-out operations. For example, in an architectural video tour, the diffusion engine might learn that certain building facade patterns tend to exhibit specific detailed features at higher resolutions, allowing for accurate prediction of architectural details when zooming in.

In a step 2330, user zoom interactions are monitored to determine whether to implement zoom-in detail enhancement or zoom-out scene expansion. This step involves tracking user input through interface elements such as touch gestures, mouse movements, or explicit zoom controls to understand the user's intended exploration direction and magnitude. The system differentiates between zoom-in requests, where users want to see more detail in a specific region, and zoom-out requests, where users want to gain broader context beyond the original frame boundaries. For instance, in a digital museum application, the system would detect whether a user is pinching outward to examine the brushstrokes in a painting (zoom-in) or pinching inward to see the entire gallery wall containing multiple paintings (zoom-out), and route the request to the appropriate processing pipeline.

In a step 2340, for zoom-in operations, synthetic details are generated for regions beyond original resolution using the generative AI model to predict plausible fine structures. When a user zooms beyond the resolution limits of the original video, the generative AI model creates new details that were not captured in the original footage but are consistent with its visual style and content. For example, when zooming into a crowd at a sporting event, the generative model might create plausible facial features for distant spectators, realistic fabric textures on clothing, or detailed expressions that maintain consistency with the overall scene context. This generative process is guided by the mini-Lorentzian representation, which provides the structural foundation for detail synthesis, ensuring that generated elements align with the original video's content and style.

In a step 2350, for zoom-out operations, the generative AI model is employed to expand the visual field with contextually appropriate surrounding elements. When users zoom out beyond the boundaries of the original frame, the system generates plausible content for the newly revealed areas. This requires understanding the scene context and extending it in a coherent manner. For example, in a documentary about a historical building, zooming out might reveal the surrounding street, neighboring buildings, and landscaping that weren't included in the original frame but are created to be historically accurate and visually consistent with the available footage. The generative model uses the mini-Lorentzian representation to understand the scene's style, lighting, and content, then extends these attributes into the expanded regions.

In a step 2360, temporal consistency validation is applied to ensure that generated content maintains coherence across consecutive frames. This validation process verifies that the AI-generated details, whether for zoom-in or zoom-out operations, remain stable and consistent over time as the video plays. This is crucial for maintaining the illusion of a continuous, natural zoom experience without distracting flickering or sudden changes in the generated content. For instance, when zooming into a flowing river while the video plays, the system ensures that the generated water ripple details not only look realistic in each frame but also move consistently with the flow of water across frames. This temporal consistency is particularly important for dynamic scenes where both the camera and subjects may be in motion during zoom operations.

In a step 2370, the enhanced video is output with seamless transitions between original and generated content as zoom level changes. This final step delivers the processed video with integrated zoom capabilities to the user, presenting a fluid experience whether zooming in to explore fine details or zooming out to gain context. The output includes sophisticated blending mechanisms that ensure smooth transitions between different levels of detail and between original and generated content. For example, in an educational nature video, a user could start with a view of a forest ecosystem, smoothly zoom in to examine the structure of a specific plant, continue zooming to see cellular details that weren't in the original footage but are biologically accurate, then zoom back out beyond the original frame to see the broader geological context of the region-all with imperceptible transitions between recorded and generated content.

This bidirectional zoom method revolutionizes video interaction by enabling users to freely explore content at any scale—from microscopic details to panoramic views—regardless of the original video resolution or framing. Applications range from entertainment platforms where viewers can discover hidden details in scenes or explore beyond the frame; interactive educational content where students can examine subjects across multiple scales of organization; professional tools for forensic analysis, medical imaging, or sports coaching where both detail examination and contextual understanding are valuable; and virtual tourism experiences where visitors can freely explore locations by zooming into interesting features or zooming out to understand geographical context.

FIG. 18 is a flow diagram illustrating an exemplary method for compressing and restoring video data using Lorentzian autoencoders. In a first step 1800, a video segment is extracted from a video input, forming a three-dimensional tensor where the first two dimensions comprise spatial data and the third dimension represents time. This initial step involves isolating a manageable portion of video data for processing, typically consisting of a sequence of frames. The extraction process may involve techniques such as sliding windows over the video stream, scene detection for natural segmentation, or fixed-interval partitioning. For example, in a high-definition video streaming application, the system might extract segments of 30 frames (1 second at 30 fps) with spatial dimensions of 1920×1080 pixels, forming a tensor of shape [1920, 1080, 30, 3] where the last dimension represents the RGB color channels. The three-dimensional tensor structure is essential for preserving the spatiotemporal relationships within the video data, allowing the system to model both spatial patterns and temporal dynamics simultaneously.

In a step 1810, the three-dimensional tensor is processed through a Lorentzian autoencoder to produce a compact mini-Lorentzian representation that preserves spatial and temporal relationships. The Lorentzian autoencoder employs specialized 3D convolutional neural networks that operate across both spatial and temporal dimensions. Unlike traditional autoencoders that might flatten video frames into vectors, the Lorentzian autoencoder maintains the tensor structure throughout the encoding process. This step involves a series of 3D convolutional operations, potentially with pooling layers and non-linear activations that progressively reduce the dimensions of the input tensor while extracting relevant features. The encoding process effectively maps the high-dimensional video data into a lower-dimensional latent space while preserving the essential spatial and temporal patterns. For instance, the original [1920, 1080, 30, 3] tensor might be compressed to a mini-Lorentzian representation of shape [240, 135, 10, 64], significantly reducing the data size while maintaining the tensor structure.

In a step 1820, the mini-Lorentzian representation is stored as a compressed output that maintains the tensor structure while significantly reducing dimensionality. This step involves the efficient storage or transmission of the compressed representation, potentially with additional entropy coding or quantization to further reduce the data size. The storage format preserves the tensor structure of the mini-Lorentzian representation, which is crucial for the subsequent restoration processes. Unlike traditional compression approaches that might store video frames independently or use motion vector approximations, the mini-Lorentzian format encapsulates both spatial and temporal information in an integrated representation. This enables more efficient storage while maintaining the information necessary for high-quality restoration. In practical implementations, this step might also involve metadata management, indexing, or organization of the compressed data to facilitate efficient retrieval and processing.

In a step 1830, the mini-Lorentzian representation is processed through a latent diffusion engine to model temporal dynamics and predict potential missing information. The latent diffusion engine analyzes patterns and trajectories within the mini-Lorentzian representation to understand how features evolve over time. This step employs specialized neural network architectures designed to capture temporal dependencies and dynamics in the latent space. The latent diffusion engine may use techniques such as but not limited to recurrent neural networks, attention mechanisms, or transformer architectures to model how the compressed representation would evolve over time. By understanding these temporal dynamics, the system can predict information that might have been lost during compression or generate plausible extensions beyond the original video segment. For example, in a surveillance video application, the latent diffusion engine might predict how objects in the scene would continue to move beyond the recorded frames, enabling more effective analysis and restoration.

In a step 1840, the mini-Lorentzian representation and latent diffusion model outputs are input to a three-dimensional convolutional decoder to produce a decompressed output. The 3D convolutional decoder performs operations that are essentially the inverse of the encoding process, progressively expanding the spatial and temporal dimensions while reducing the feature depth. This step involves a series of transposed 3D convolutions, upsampling operations, and potentially skip connections from the encoder to preserve fine details. The decoder combines the structured information from the mini-Lorentzian representation with the temporal predictions from the latent diffusion engine to generate a decompressed video segment that approximates the original input. The decoder's architecture is typically symmetric to the encoder, with corresponding layers that gradually restore the original dimensions of the video data. The integration of the latent diffusion model outputs enhances the temporal coherence and visual quality of the decompressed video, particularly for dynamic content with complex motion patterns.

In a step 1850, an enhanced correlation network is applied to the decompressed output to restore data potentially lost during compression by leveraging relationships between multiple mini-Lorentzian representations. The correlation network identifies patterns and similarities across different video segments or regions within a segment to enhance the restoration quality. This step involves analyzing how different parts of the video relate to each other and using these relationships to recover information that might have been lost during compression. The correlation network may employ self-attention mechanisms, graph neural networks, or other architectures designed to capture non-local dependencies within the data. For example, in a video conference application, the correlation network might identify that certain facial expressions or hand gestures repeat throughout the video, allowing it to enhance the details of these features based on their best-preserved instances. By exploiting these correlations, the system can achieve higher restoration quality than would be possible from the compressed representation alone.

In a step 1860, resolution and detail levels are controlled using a zoom controller that interfaces with both the latent diffusion engine and decoder network. The zoom controller manages the synthesis of fine details when zooming into specific regions of the video. This step involves determining the appropriate level of detail required for the current zoom level and directing the decoder to generate the necessary information. The zoom controller works in conjunction with the latent diffusion engine to predict plausible details at finer scales than were present in the original video. This enables the infinite zoom capability, where users can continuously zoom into regions of interest beyond the resolution limits of the original recording. The zoom controller may employ techniques such as progressive generation of details, detail synthesis guided by learned priors, or multi-scale representation management to achieve smooth and realistic zooming experiences. For instance, in a security footage analysis application, the zoom controller might enable investigators to zoom into a license plate or facial features with continuously increasing detail, even beyond what was captured in the original video.

In a step 1870, the restored video data is output with enhanced quality, preserving both spatial details and temporal coherence. This final step delivers the fully processed video segment, which has undergone compression, restoration, and potentially enhancement through the various components of the system. The output maintains the original dimensions and structure of the video data but with improved quality compared to what would be achieved with traditional compression methods at equivalent data rates. The spatial details are preserved or enhanced through the correlation network, while the temporal coherence is maintained through the latent diffusion engine and 3D convolutional processing. The output video may be displayed to users, further processed for specific applications, or integrated into broader systems. The enhanced quality is particularly evident in complex scenes with fine details or dynamic content, where traditional compression approaches might introduce artifacts or temporal inconsistencies.

FIG. 19 is a flow diagram illustrating an exemplary method for implementing infinite zoom capability using hierarchical Lorentzian representations. In a first step 1900, a video input is organized into sequential segments, each represented as a three-dimensional tensor with spatial and temporal dimensions. This organizational step involves partitioning the incoming video stream into manageable units for processing by the Lorentzian autoencoder system. The segmentation may be performed based on various criteria such as scene changes, fixed time intervals, or content characteristics. Each segment is structured as a three-dimensional tensor where the first two dimensions represent spatial information (height and width), and the third dimension represents time (sequence of frames). For example, in a satellite imagery application, a continuous video feed might be divided into 5-second segments, each containing 150 frames at 30 frames per second, with spatial dimensions corresponding to the camera resolution. This tensor structure preserves the spatial and temporal relationships within each video segment, which is essential for the subsequent processing steps. The organization may also involve preprocessing techniques such as stabilization, noise reduction, or color normalization to ensure consistent input quality across segments.

In a step 1910, each video segment is compressed using a Lorentzian autoencoder to create multi-level representations at different scales of detail. The Lorentzian autoencoder employs a hierarchical approach to compression, generating representations at multiple resolutions or scales rather than a single compressed format. This multi-level compression process involves a cascade of encoding operations, each focused on capturing features at different levels of detail. The highest level represents coarse, global features, while subsequent levels capture increasingly fine-grained details. For instance, in a medical imaging application, the first level might capture the overall structure of an organ, the second level might represent tissue boundaries, and the third level might preserve cellular details. The Lorentzian autoencoder maintains the tensor structure throughout this hierarchical compression, ensuring that spatiotemporal relationships are preserved at each scale. This approach differs from traditional compression methods that typically generate a single compressed representation, as the multi-level structure specifically supports the zoom functionality implemented in subsequent steps.

In a step 1920, the hierarchical mini-Lorentzian representations are stored in a structured format that preserves relationships between different resolution levels. This storage step involves organizing the multi-level compressed representations in a way that maintains their hierarchical relationships and facilitates efficient retrieval. The storage format may implement various data structures such as pyramidal representations, octrees, or other hierarchical schemes that explicitly encode the connections between different resolution levels. For example, in a video surveillance system, the storage might organize the representations in a pyramid-like structure where each level contains a progressively higher-resolution representation of the same content, with explicit links between corresponding regions across levels. The structured storage also includes metadata that describes the relationships between different scales and regions, facilitating navigation across the hierarchy during zoom operations. This organization ensures that when a user zooms into a specific region, the system can efficiently access the appropriate level of detail from the stored representations.

In a step 1930, the latent space dynamics are analyzed using a diffusion engine to understand patterns of detail across different scales. This analytical step involves examining how features and patterns in the latent space vary across different resolution levels and how they evolve over time. The diffusion engine applies specialized neural network architectures designed to model transitions between different scales of detail. It learns how features at coarser scales relate to and predict features at finer scales, enabling more effective synthesis of high-resolution details. For instance, in an astronomical video application, the diffusion engine might learn that certain cloud patterns in a gas nebula tend to exhibit fractal-like detail at higher resolutions, with specific types of turbulence emerging at finer scales. This analysis creates a predictive model of detail across scales, which guides the subsequent detail synthesis process. The diffusion engine may employ techniques such as score-based generative models, energy-based models, or other approaches that can model complex distributions and transitions in the latent space.

In a step 1940, zoom instructions are received from a user interface specifying a region of interest and desired magnification level. This interactive step involves capturing user input regarding which part of the video they wish to examine more closely and how much they want to magnify it. The user interface may provide various input mechanisms such as mouse controls, touch gestures, or explicit numerical inputs for specifying the zoom parameters. For example, in a sports video analysis application, a coach might use a bounding box to select a specific player and request a 4× magnification to examine their technique in greater detail. The zoom instructions include both spatial information (the selected region of interest) and scale information (the desired magnification level). The user interface may also support additional parameters such as zoom speed, transition effects, or specific enhancement requests. This step provides the essential input for the subsequent zoom processing steps, directing the system to focus its computational resources on the relevant portion of the video content.

In a step 1950, the zoom controller is activated to select appropriate levels from the hierarchical Lorentzian representations based on the zoom parameters. The zoom controller determines which levels of the hierarchical representation should be accessed to achieve the requested magnification while maintaining optimal visual quality. For lower magnification levels, the controller might directly use the stored representations from the appropriate level of the hierarchy. As the magnification increases beyond what was explicitly stored, the controller creates a processing plan that combines information from multiple levels and prepares for the synthesis of new details. For instance, in a retail security application, if a user zooms into a barcode at 2× magnification, the zoom controller might directly access the next level of detail from the hierarchy; but at 8× magnification, it would need to combine the finest stored level with synthesized details. The zoom controller also manages transitions between different levels of detail, ensuring smooth visual experiences as the user adjusts the magnification. It determines the optimal balance between using stored information and generating new details based on factors such as computational resources, required response time, and desired quality.

In a step 1960, synthetic details are generated for regions beyond original resolution using the correlation network to predict plausible fine structures. This generative step creates new visual information that was not explicitly present in the original video but is consistent with its content and style. The correlation network analyzes patterns and relationships in the available data to infer how details would likely appear at finer scales than were captured in the original recording. It leverages both spatial correlations (patterns across different regions of the same frame) and temporal correlations (patterns across different frames) to guide this synthesis process. For example, in an archaeological documentation application, when zooming into ancient text inscriptions, the correlation network might generate enhanced details of partially eroded characters based on the patterns observed in better-preserved sections and similar characters elsewhere in the inscription. The detail synthesis process combines multiple approaches, including pattern matching, style transfer, and generative modeling, to create visually plausible fine structures. The correlation network ensures that the synthesized details maintain consistency with the surrounding content and adhere to the natural statistics of the video domain, avoiding artifacts or unrealistic features.

In a step 1970, the selected region is rendered with progressively enhanced detail, seamlessly blending recorded and synthesized information for a continuous zoom experience. This final rendering step combines the multiple levels of detail, including both the stored representations and the newly synthesized details, into a coherent visual output. The rendering process employs sophisticated blending techniques to create smooth transitions between different levels of detail and between recorded and synthesized content. For instance, in a real estate virtual tour application, as a user zooms into the details of a property's architectural features, the system would smoothly blend from the recorded overview to increasingly detailed views, with synthesized fine details appearing naturally as the zoom continues. The rendering may also incorporate visual enhancements such as sharpening, contrast adjustment, or noise reduction to improve the perceived quality of the zoomed region. The progressive nature of the rendering ensures that details appear gradually and naturally as the zoom level increases, rather than suddenly popping into view. This creates a continuous zoom experience that feels natural and immersive to the user, even when examining regions at magnification levels far beyond the original recording resolution.

FIG. 6 is a flow diagram illustrating an exemplary method for compressing a data input using a system for compressing and restoring data using multi-level autoencoders and correlation networks. In a first step 600, a plurality of data sets is collected from a plurality of data sources. These data sources can include various sensors, devices, databases, or any other systems that generate or store data. The data sets may be heterogeneous in nature, meaning they can have different formats, structures, or modalities. For example, the data sets can include images, videos, audio recordings, time-series data, numerical data, or textual data. The collection process involves acquiring the data sets from their respective sources and bringing them into a centralized system for further processing.

In a step 610, the collected data sets are preprocessed using a data preprocessor. The data preprocessor may be responsible for cleaning, transforming, and preparing the data sets for subsequent analysis and compression. Preprocessing tasks may include but are not limited to data cleansing, data integration, data transformation, and feature extraction. Data cleansing involves removing or correcting any erroneous, missing, or inconsistent data points. Data integration combines data from multiple sources into a unified format. Data transformation converts the data into a suitable representation for further processing, such as scaling, normalization, or encoding categorical variables. Feature extraction identifies and selects relevant features or attributes from the data sets that are most informative for the given task.

A step 620 involves normalizing the preprocessed data sets using a data normalizer. Normalization is a step that brings the data into a common scale and range. It helps to remove any biases or inconsistencies that may exist due to different units or scales of measurement. The data normalizer applies various normalization techniques, such as min-max scaling, z-score normalization, or unit vector normalization, depending on the nature of the data and the requirements of the subsequent compression step. Normalization ensures that all the data sets have a consistent representation and can be compared and processed effectively.

In a step 630, the normalized data sets are compressed into a compressed output using a multi-layer autoencoder network. The multi-layer autoencoder network is a deep learning model designed to learn compact and meaningful representations of the input data. It consists of an encoder network and a decoder network. The encoder network takes the normalized data sets as input and progressively compresses them through a series of layers, such as but not limited to convolutional layers, pooling layers, and fully connected layers. The compressed representation is obtained at the bottleneck layer of the encoder network, which has a significantly reduced dimensionality compared to the original data. The multi-layer autoencoder network may utilize a plurality of encoder networks to achieve optimal compression performance. These encoder networks can include different architectures, loss functions, or optimization techniques. The choice of compression technique depends on the specific characteristics and requirements of the data sets being compressed. During the compression process, the multi-layer autoencoder network learns to capture the essential features and patterns present in the data sets while discarding redundant or irrelevant information. It aims to minimize the reconstruction error between the original data and the reconstructed data obtained from the compressed representation. In step 640, the compressed output generated by the multi-layer autoencoder network is either outputted or stored for future processing. The compressed output represents the compact and informative representation of the original data sets. It can be transmitted, stored, or further analyzed depending on the specific application or use case. The compressed output significantly reduces the storage and transmission requirements compared to the original data sets, making it more efficient for downstream tasks.

Figure 7:
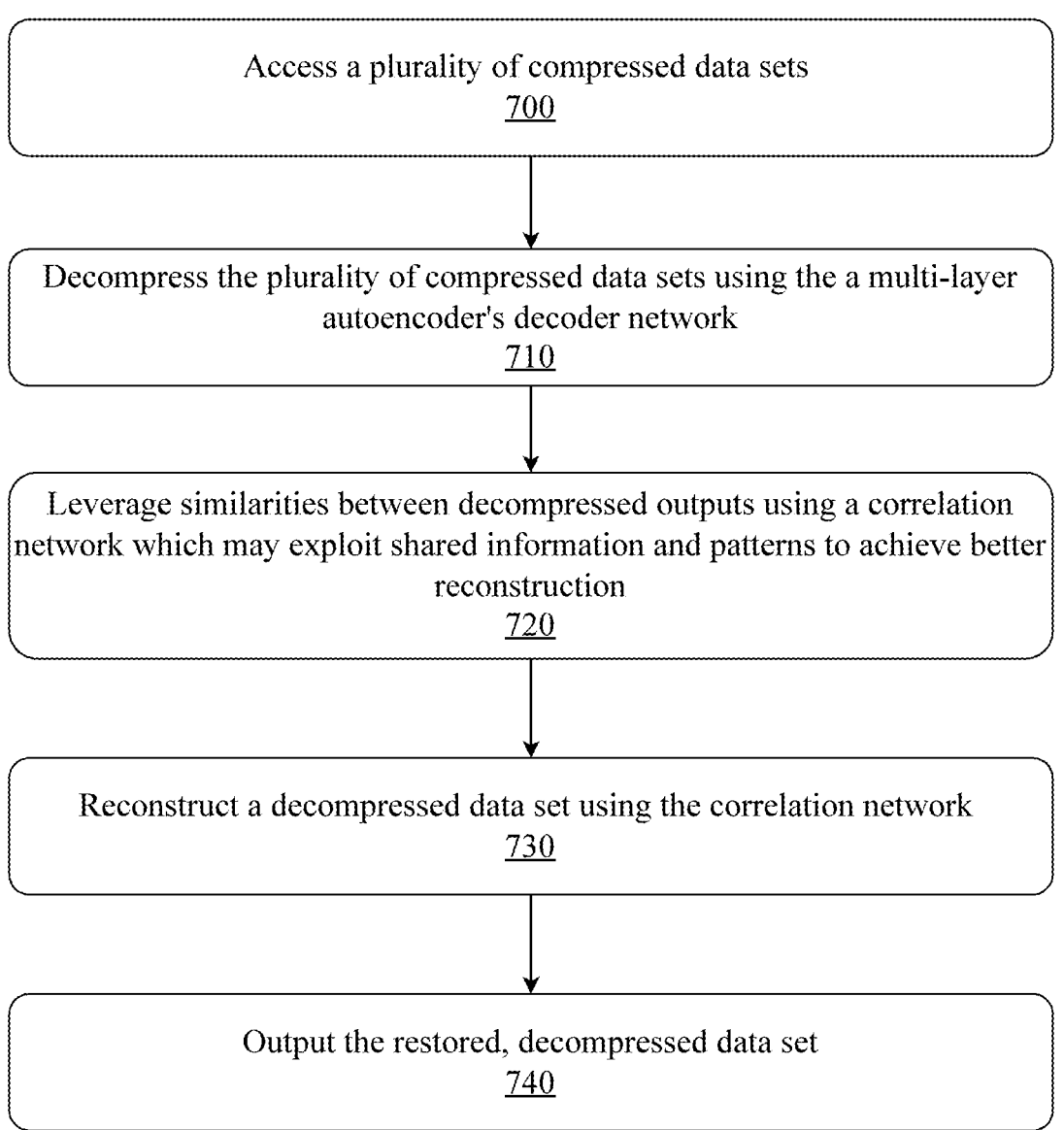
FIG. 7 is a flow diagram illustrating an exemplary method for decompressing a compressed data input using system for compressing and restoring data using multi-level autoencoders and correlation networks.

FIG. 7 is a flow diagram illustrating an exemplary method for decompressing a compressed data input using system for compressing and restoring data using multi-level autoencoders and correlation networks. In a first step, 700, access a plurality of compressed data sets. In a step 710, decompress the plurality of compressed data sets using a multi-layer autoencoder's decoder network. The decoder network is responsible for mapping the latent space vectors back to the original data space. The decoder network may include techniques such as transposed convolutions, upsampling layers, or generative models, depending on the specific requirements of the data and the compression method used.

In a step 720, leverage the similarities between decompressed outputs using a correlation network which may exploit shared information and patterns to achieve a better reconstruction. The correlation network is a deep learning model specifically designed to exploit the shared information and patterns among the compressed data sets. It takes the organized decompressed data sets as input and learns to capture the correlations and dependencies between them. The correlation network may consist of multiple layers, such as convolutional layers, recurrent layers, or attention mechanisms, which enable it to effectively model the relationships and similarities among the compressed data sets.

In a step 730, the compressed data sets are reconstructed using the correlation network. The reconstruction process in step 730 combines the capabilities of the correlation network and the decompression systems. The correlation network provides the enhanced and refined latent space representations, while the decompression systems use these representations to generate the reconstructed data. In a step 740, the restored, decompressed data set is outputted. The restored data set represents the reconstructed version of the original data, which includes recovered information lost during the compression process. The outputted data set more closely resembles the original data than would a decompressed output passed solely through a decoder network.

Figure 8:
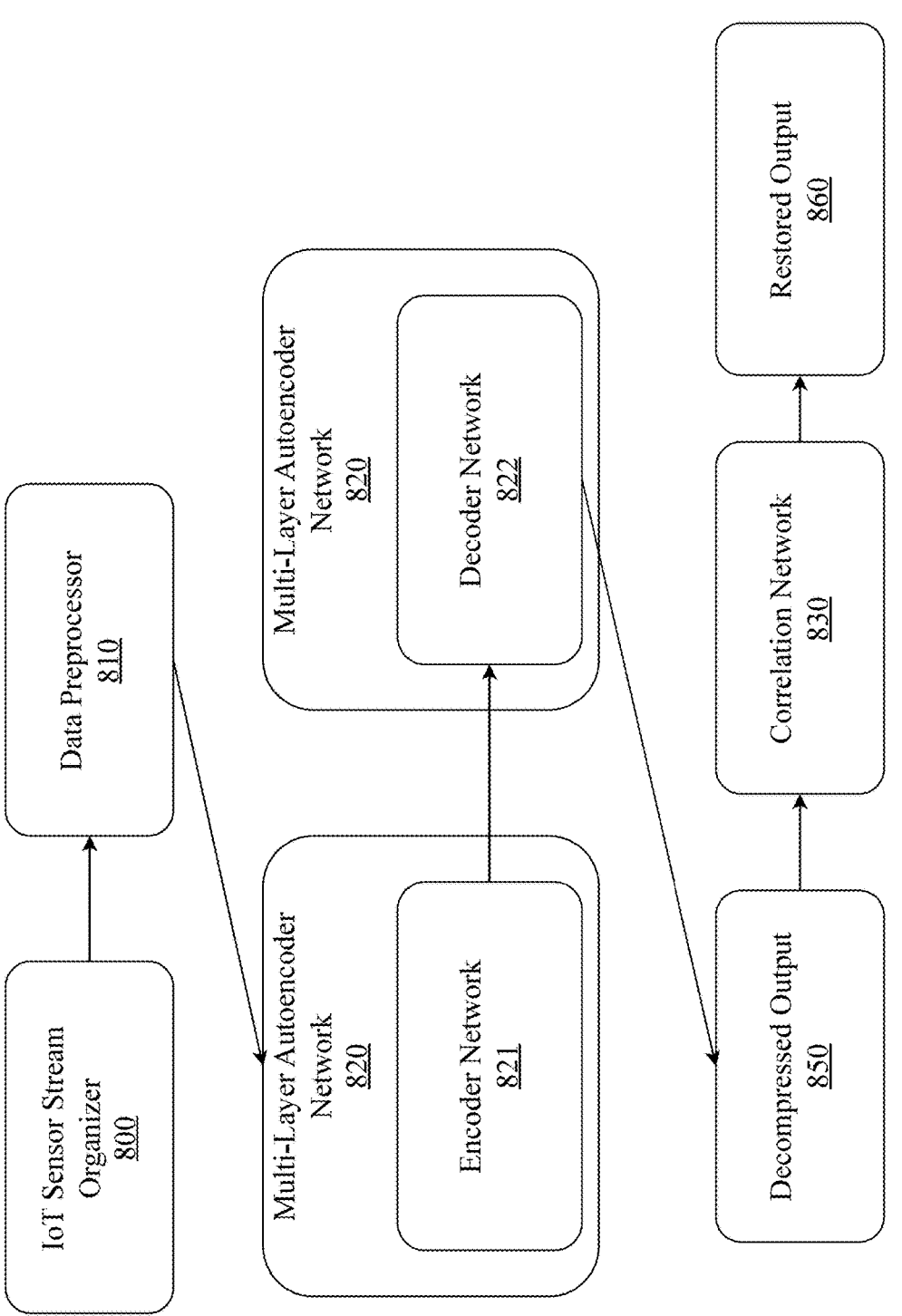
FIG. 8 is a block diagram illustrating an exemplary system architecture for compressing and restoring IoT sensor data using a system for compressing and restoring data using multi-level autoencoders and correlation networks.

FIG. 8 is a block diagram illustrating an exemplary system architecture for compressing and restoring IoT sensor data using a system for compressing and restoring data using multi-level autoencoders and correlation networks. The IoT Sensor Stream Organizer 800 is responsible for collecting and organizing data streams from various IoT sensors. It receives raw sensor data from multiple sources, such as but not limited to temperature sensors, humidity sensors, and accelerometers. The IoT Sensor Stream Organizer 800 may perform necessary preprocessing tasks, such as data cleaning, normalization, and synchronization, to ensure the data is in a suitable format for further processing. The preprocessed IoT sensor data is then passed to a data preprocessor 810. The data preprocessor 810 prepares the data for compression by transforming it into a latent space representation. It applies techniques such as feature extraction, dimensionality reduction, and data normalization to extract meaningful features and reduce the dimensionality of the data. The latent space representation captures the essential characteristics of the IoT sensor data while reducing its size.

The multi-layer autoencoder 820 is responsible for compressing and decompressing the latent space representation of the IoT sensor data. It consists of an encoder network 821 and a decoder network 822. The encoder network 821 takes the latent space representation as input and progressively compresses it through a series of layers, such as but not limited to convolutional layers, pooling layers, and fully connected layers. The compressed representation may pass through a bottleneck layer which transforms the original data to have a significantly reduced dimensionality compared to the original data. Further, the encoder network 821 manages the compression process and stores the compressed representation of the IoT sensor data. It determines the optimal compression settings based on factors such as the desired compression ratio, data characteristics, and available storage resources. The compressed representation is efficiently stored or transmitted, reducing the storage and bandwidth requirements for IoT sensor data.

The decoder network 822 is responsible for reconstructing the original IoT sensor data from the compressed representation. It utilizes the multi-layer autoencoder 820 to map the compressed representation back to the original data space. The decoder network consists of layers such as transposed convolutional layers, upsampling layers, and fully connected layers. It learns to reconstruct the original data by minimizing the reconstruction error between the decompressed output and the original IoT sensor data. The decompressed output 850 represents the decompressed IoT sensor data obtained from the decoder network 822. It closely resembles the original data and retains the essential information captured by the sensors, but includes some information lost during the compressed process. The decompressed output 850 may be further processed, analyzed, or utilized by downstream applications or systems.

To further enhance the compression and reconstruction quality, the system includes a correlation network 830. The correlation network 830 learns and exploits correlations and patterns within the IoT sensor data to improve the reconstruction process. It consists of multiple correlation layers that capture dependencies and relationships among different sensors or data streams. The correlation network 830 helps in preserving important information that may have been lost during the compression process. Following the identification of dependencies and relationships among different data streams, the correlation network 830 reconstruct a decompressed output 850 into a restored output 860 which recovers much of the data lost during the compression and decompression process.

The system may be trained using an end-to-end approach, where the multi-layer autoencoder 820 and the correlation network 830 are jointly optimized to minimize the reconstruction error and maximize the compression ratio. The training process may involves feeding the IoT sensor data through the system, comparing the decompressed output with the original data, and updating the network parameters using backpropagation and gradient descent techniques. The proposed system offers several advantages for IoT sensor data compression. It achieves high compression ratios while preserving the essential information in the data. The multi-layer autoencoder 820 learns compact and meaningful representations of the data, exploiting spatial and temporal correlations. The correlation network 830 further enhances the compression quality by capturing dependencies and patterns within the data. Moreover, the system is adaptable and can handle various types of IoT sensor data, making it suitable for a wide range of IoT applications. It can be deployed on resource-constrained IoT devices or edge servers, reducing storage and transmission costs while maintaining data quality.

FIG. 9 is a flow diagram illustrating an exemplary method for compressing and decompressing IoT sensor data using a system for compressing and restoring data using multi-level autoencoders and correlation networks. In a first step 900, incoming IoT sensor data is organized based on its origin sensor type. IoT sensor data can be generated from various types of sensors, such as but not limited to temperature sensors, humidity sensors, pressure sensors, accelerometers, or any other sensors deployed in an IoT network. Each sensor type captures specific measurements or data points relevant to its function. The organization step involves categorizing and grouping the incoming IoT sensor data based on the type of sensor it originated from. This step helps to maintain a structured and organized representation of the data, facilitating subsequent processing and analysis.

In a step 910, the latent space vectors for each IoT sensor data set are preprocessed. Latent space vectors are lower-dimensional representations of the original data that capture the essential features and patterns. Preprocessing the latent space vectors involves applying various techniques to ensure data quality, consistency, and compatibility. This may include but is not limited to data cleaning, normalization, feature scaling, or dimensionality reduction. The preprocessing step aims to remove any noise, outliers, or inconsistencies in the latent space vectors and prepare them for the compression process.

A step 920 involves compressing each IoT sensor data set using a multi-layer autoencoder network. The multi-layer autoencoder network is a deep learning model designed to learn compact and meaningful representations of the input data. It consists of a encoder network and a decoder network. The encoder network takes the preprocessed latent space vectors as input and progressively compresses them through a series of layers, such as convolutional layers, pooling layers, and fully connected layers. The compressed representation is obtained at the bottleneck layer of the encoder network, which has a significantly reduced dimensionality compared to the original data. The multi-layer autoencoder network may include a compression system that specifically handles the compression of IoT sensor data. The compression system can employ various techniques, such as quantization, entropy coding, or sparse representations, to achieve efficient compression while preserving the essential information in the data. The compression system outputs a compressed IoT sensor data set, which is a compact representation of the original data. In step 930, the original IoT sensor data is decompressed using a decoder network. The decoder network is responsible for reconstructing the original data from the compressed representation. It takes the compressed IoT sensor data sets and applies a series of decompression operations, such as transposed convolutions or upsampling layers, to map the compressed data back to its original dimensionality.

In a step 940, correlations between compressed IoT sensor data sets are identified using a correlation network. The correlation network is a separate deep learning model that learns to capture the relationships and dependencies among different compressed IoT sensor data sets. It takes the decompressed data sets as input and identifies patterns, similarities, and correlations among them. The correlation network can utilize techniques such as convolutional layers, attention mechanisms, or graph neural networks to effectively model the interactions and dependencies between the compressed data sets. The identified correlations provide valuable insights into how different IoT sensor data sets are related and how they influence each other. These correlations can be used to improve the compression efficiency and enhance the restoration quality of the data.

In a step 950, the correlation network creates a restored, more reconstructed version of the decompressed output. By leveraging correlations between decompressed outputs, the correlation network is able to recover a large portion of information lost during the compression and decompression process. The restored, reconstructed output is similar to the decompressed output and the original input, but recovers information that may have been missing in the decompressed output.

Figure 10:
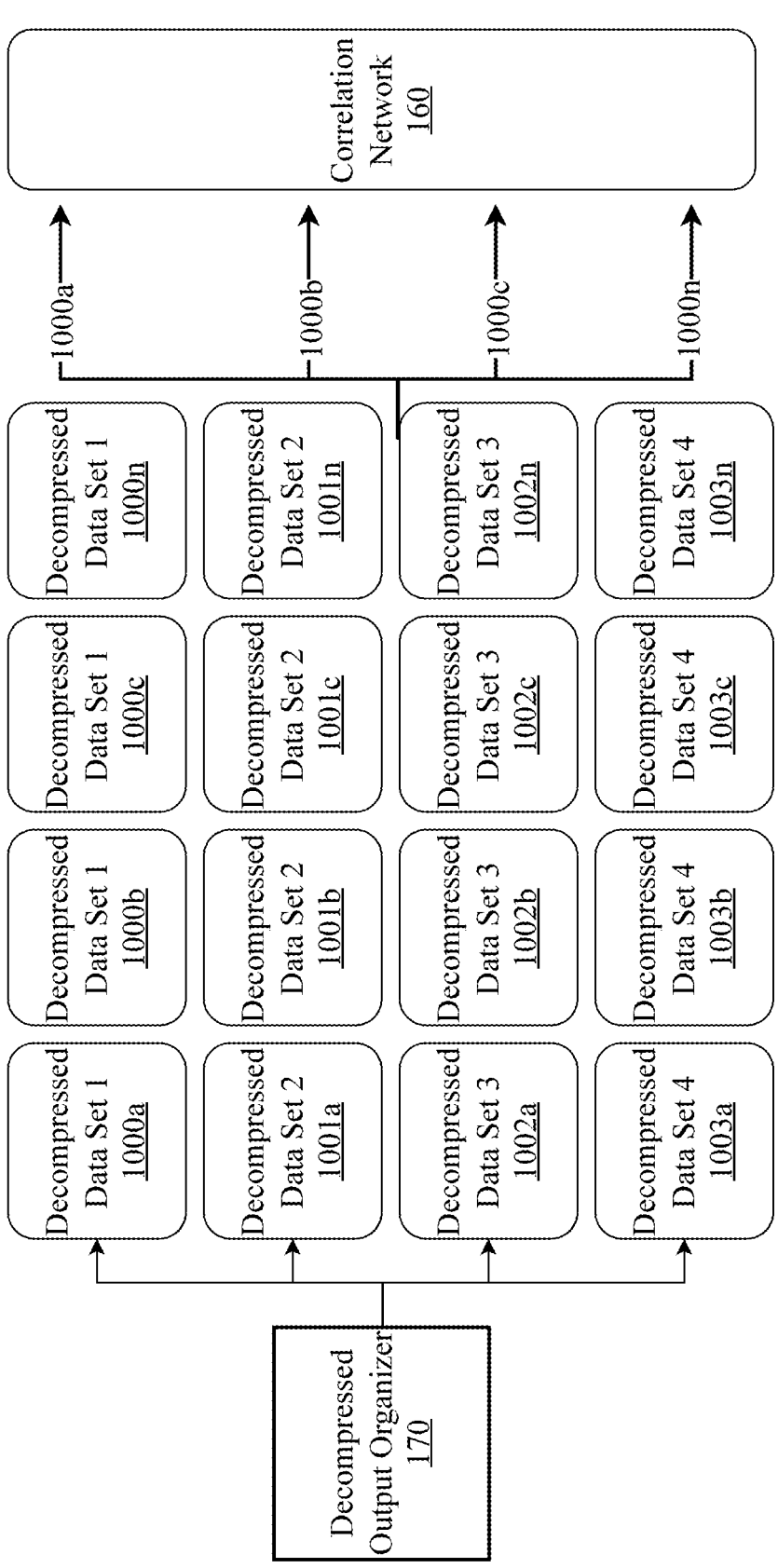
FIG. 10 is a block diagram illustrating an exemplary system architecture for a subsystem of the system for compressing and restoring data using multi-level autoencoders and correlation networks, the decompressed output organizer.

FIG. 10 is a block diagram illustrating an exemplary system architecture for a subsystem of the system for compressing and restoring data using multi-level autoencoders and correlation networks, the decompressed output organizer. In one embodiment, the decompressed output organizer 170 may create a matrix of n by n data sets where each data sets represents a decompressed set of information. In the embodiment depicted, the decompressed output organizer 170 outputs a 4 by 4 matrix of decompressed data sets. The organizer 170 may organizer the decompressed data sets into groups based on how correlated each data set is to each other. For example, decompressed data set 1 which includes 1000*a*, 1000*b*, 1000*c*, and 1000*n*, is a set of four data sets that the decompressed output organizer 170 has determined to be highly correlated. The same is true for decompressed data sets 2, 3, and 4.

The decompressed output organizer primes the correlation network 160 to receive an already organizer plurality of inputs. The correlation network may take a plurality of decompressed data sets as its input, depending on the size of the organized matrix produced by the decompressed output organizer 170. For example, in the embodiment depicted in FIG. 10, the decompressed output organizer 170 produces a 4 by 4 matrix of data sets. The correlation network in turn receives a 4 element data set as its input. If decompressed data set 1 were to be processed by the correlation network 160, the correlation network 160 may take 1000*a*, 1000*b*, 1000*c*, and 1000*n*, as the inputs and process all four data sets together. By clustering data sets together into groups based on how correlated they are, the decompressed output organizer 170 allows the correlation network 160 to produce more outputs that better encompass the original pre-compressed and decompressed data sets. More information may be recovered by the correlation network 160 when the inputs are already highly correlated.

Figure 11:
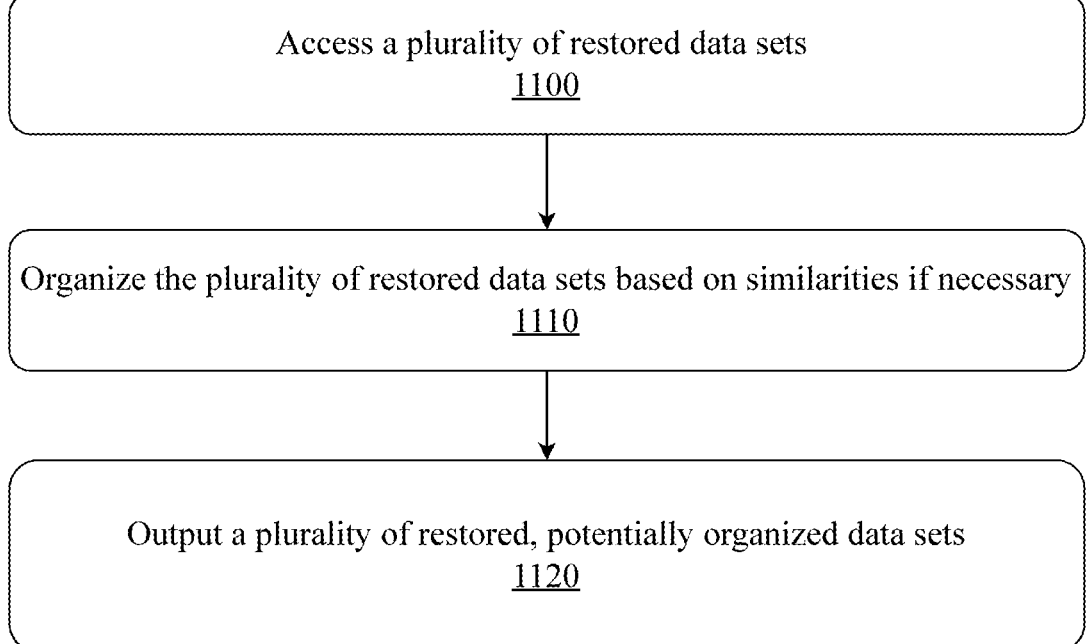
FIG. 11 is a flow diagram illustrating an exemplary method for organizing restored, decompressed data sets after correlation network processing.

FIG. 11 is a flow diagram illustrating an exemplary method for organizing restored, decompressed data sets after correlation network processing. In a first step 1100, access a plurality of restored data sets. In a step 1110, organize the plurality of restored data sets based on similarities if necessary. In a step 1120, output a plurality of restored, potentially organizer data sets. This method essentially reassesses the organizational grouping performed by the decompressed output organizer 170. The correlation network 160 may output a matrix where the matrix contains a plurality of restored, decompressed data sets. The final output of the system may reorganize the restored, decompressed data sets within the outputted matrix based on user preference and the correlations between each data set within the matrix.

Figure 12:
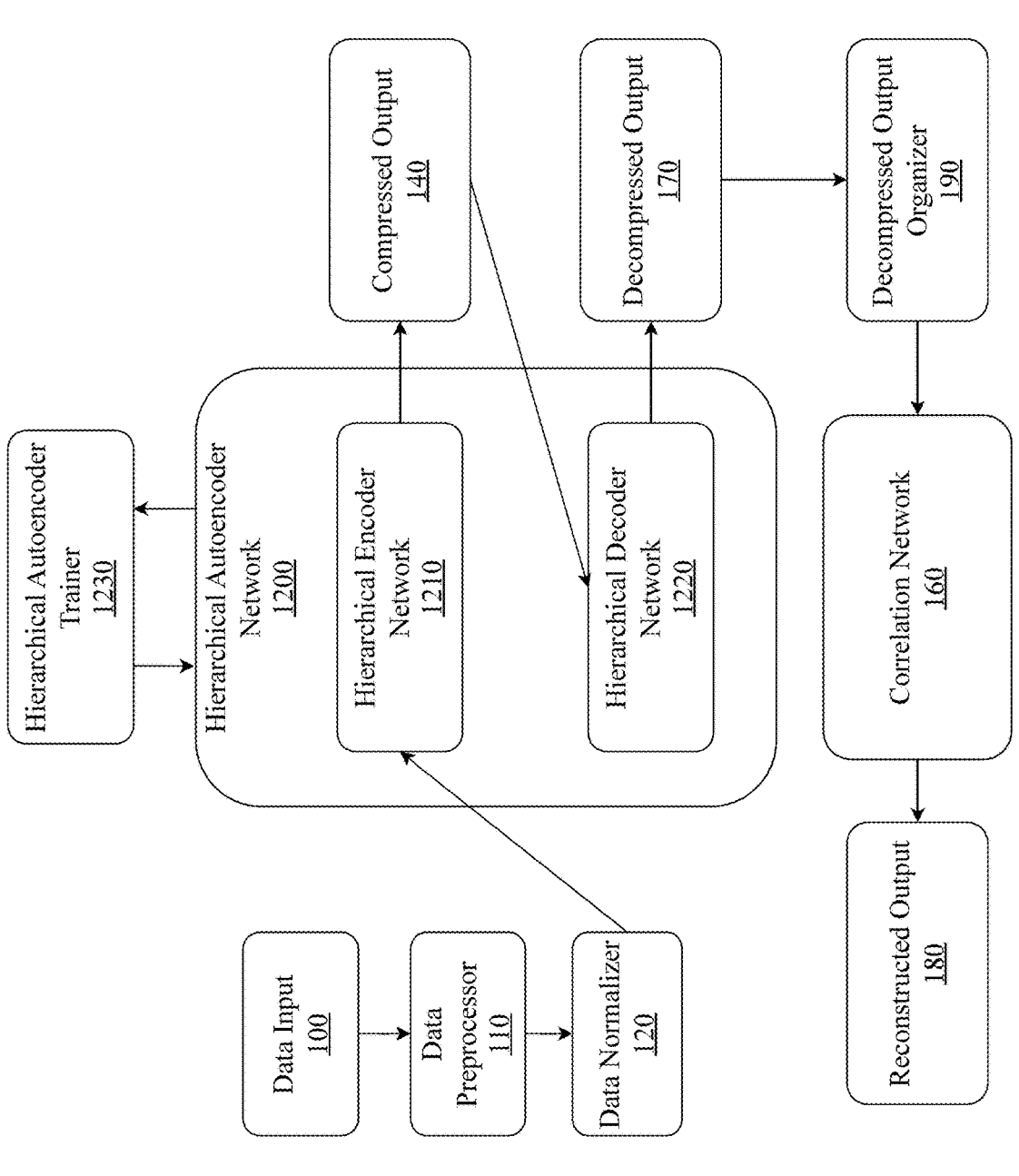
FIG. 12 is a block diagram illustrating an exemplary system architecture for compressing and restoring data using hierarchical autoencoders and correlation networks.

FIG. 12 is a block diagram illustrating an exemplary system architecture for compressing and restoring data using hierarchical autoencoders and correlation networks. This network replaces the previous single-level autoencoder, offering improved compression and decompression capabilities across multiple scales of data features.

A hierarchical autoencoder network 1200 comprises of two main components: a hierarchical encoder network 1210 and a hierarchical decoder network 1220. The hierarchical encoder network 1210 comprises multiple levels of encoders, each designed to capture and compress features at different scales. As data flows through the encoder levels, it is progressively compressed, with each level focusing on increasingly fine-grained features of the input data.

When compressing data, the system first processes the input data 100 through the data preprocessor 110 and data normalizer 120. The normalized data then enters the hierarchical encoder network 1210. The first level of the encoder captures large-scale features, passing its output to the second level, which focuses on medium-scale features. This process continues through subsequent levels, each concentrating on finer details. The final output of the hierarchical encoder network is a multi-level compressed representation, stored as the compressed output 140.

For decompression, the system utilizes the hierarchical decoder network 1220. This network mirrors the structure of the encoder but operates in reverse. The compressed output 140 enters the highest level of the decoder, which begins reconstructing the coarsest features. Each subsequent level of the decoder adds finer details to the reconstruction, using both the output from the previous level and the corresponding level's compressed representation. The final level of the decoder produces the decompressed output 170.

In one embodiment, hierarchical encoder network 1210 may include of several levels, each designed to capture features at different scales. For instance, in a four-level encoder, Level 1 (largest scale) might use convolutional layers with large kernels and aggressive pooling to capture the most general features of the image, such as overall color distribution and major structural elements. It could reduce the image to, say, ⅛ of its original dimensions. A level 2 (medium scale) which operates on the output of Level 1 might use slightly smaller kernels and less aggressive pooling to capture medium-scale features like edges and basic shapes. It might further reduce the representation to ¼ of Level 1's output. A level 3 (fine scale) could focus on more detailed features, potentially using dilated convolutions to capture longer-range dependencies without further dimension reduction. A level 4 (finest scale) might use very small kernels to capture the finest details and textures in the image, with minimal or no further dimension reduction. The compressed output 140 would be a combination of the outputs from all these levels, providing a multi-scale representation of the original image.

Similarly, hierarchical decoder network 1220 would mirror this structure in reverse. A level 4 decoder may start with the finest-scale compressed representation that begins reconstructing the detailed features and textures. A level 3 decoder may combines its input with the Level 3 compressed representation, adding finer details to the reconstruction. A level 2 decoder may utilize upsampling or transposed convolutions. This level begins to restore the spatial dimensions, adding medium-scale features back into the image. A final level further upsamples the image, restoring it to its original dimensions and reconstructing the coarsest features. Each decoder level would combine the output from the previous level with the corresponding encoder level's output, allowing for the progressive restoration of details at each scale.

This multi-level approach allows the system to efficiently compress and accurately reconstruct features at various scales, potentially leading to better overall compression performance and reconstruction quality compared to a single-level autoencoder. The system integrates a hierarchical autoencoder trainer 1230 to optimize the performance of the hierarchical autoencoder network 1200. This trainer adjusts the parameters of both the encoder and decoder networks across all levels, ensuring efficient compression and accurate reconstruction for various types of input data. After decompression, the system continues to employ the decompressed output organizer 190 and correlation network 160 leveraging multi-scale correlations to further enhance the reconstructed output 180. This hierarchical approach allows the system to adapt to a wide range of data types and scales, potentially achieving higher compression ratios while maintaining or improving the quality of data restoration.

Figure 13:
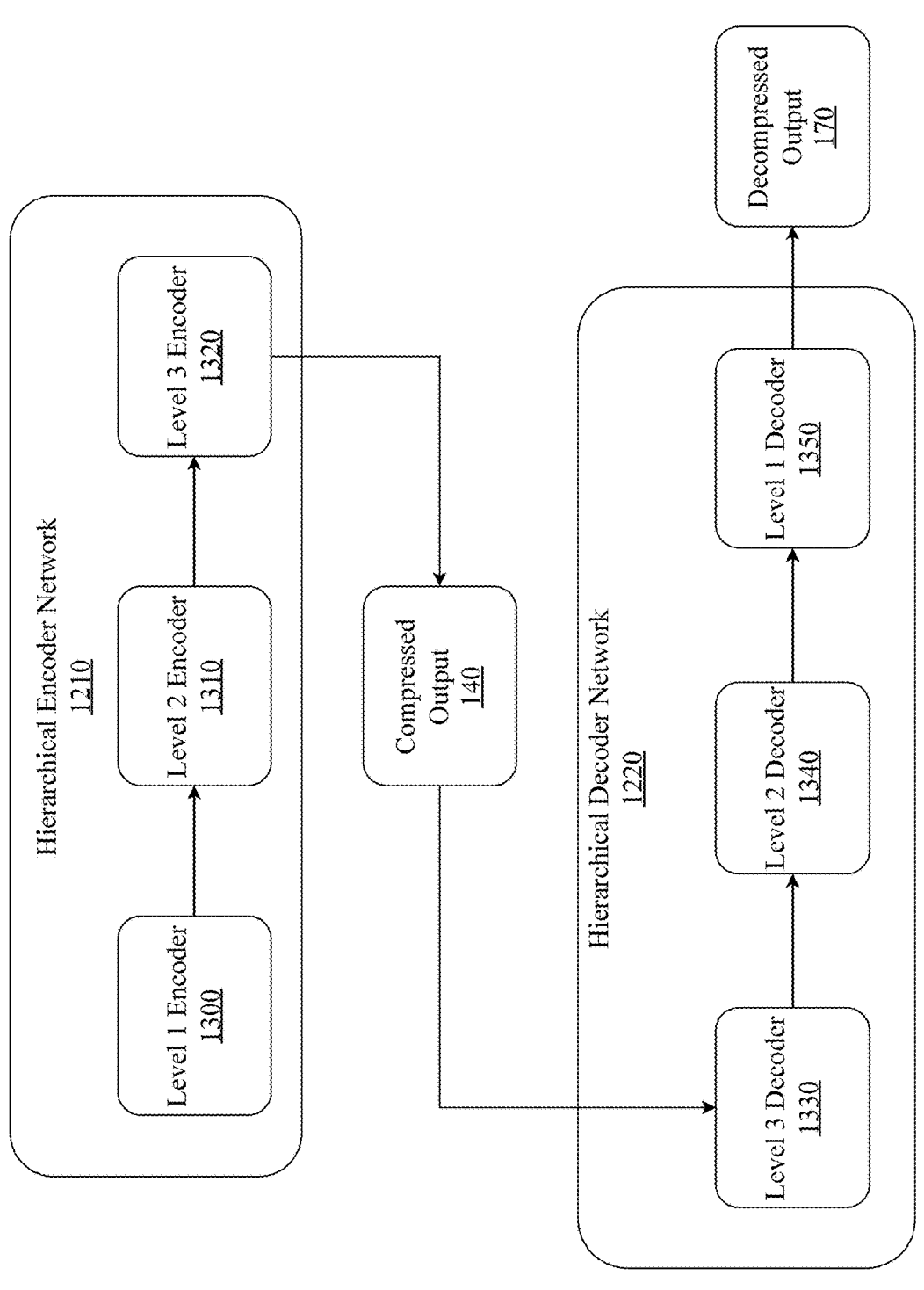
FIG. 13 is a block diagram illustrating an exemplary system architecture for a subsystem of the system for compressing and restoring data using hierarchical autoencoders and correlation networks, a hierarchical autoencoder.

FIG. 13 is a block diagram illustrating an exemplary system architecture for a subsystem of the system for compressing and restoring data using hierarchical autoencoders and correlation networks, a hierarchical autoencoder. This multi-level architecture enables the system to process and represent data at various scales, leading to more efficient compression and higher-quality restoration.

The hierarchical encoder network 1210 comprises multiple encoding levels. In the illustrated example the hierarchical encoder network includes 3 layers of both encoders and decoders to effectively compress and decompress various levels of input representations. Each level is designed to capture and compress different aspects of the input data:

A level 1 encoder 1300 focuses on large-scale, global features of the input. For instance, in image data, this level might capture overall color distributions, major structural elements, or low-frequency patterns. It employs techniques such as large convolutional kernels or aggressive pooling to downsample the input significantly. A level 2 encoder 1310 processes the output from level 1 encoder 1300, concentrating on medium-scale features. It might identify edges, basic shapes, or texture patterns. This level typically uses smaller convolutional kernels and less aggressive pooling, striking a balance between feature detail and data reduction.

A level 3 encoder 1320 targets fine-grained details in the data. It might employ techniques like dilated convolutions to capture intricate patterns or long-range dependencies without further downsampling. This level preserves the highest frequency components of the input that are still relevant for reconstruction. The outputs from all encoder levels are combined to form the compressed output 140, which is a multi-scale representation of the original input. This approach allows the system to retain important information at various scales, facilitating more effective compression than a single-scale approach.

The hierarchical decoder network 1220 mirrors the encoder structure, with level 3 decoder 1330, level 2 decoder 1340, and level 1 decoder 1350. These decoders work in concert to progressively reconstruct the original input. Level 3 decoder 1330 begins the reconstruction process using the finest-scale information from the compressed output. It may employ techniques like small convolutional kernels or attention mechanisms to start rebuilding detailed features. A level 2 decoder 1340 combines its input with corresponding information from the compressed output to add medium-scale features. It may use upsampling or transposed convolutions to increase spatial dimensions, reconstructing shapes and edges.

Level 1 decoder 1350 finalizes the reconstruction, integrating coarse-scale features and restoring the output to its original dimensions. It may use larger convolutional kernels or sophisticated upsampling techniques to ensure smooth, globally coherent outputs. In one embodiment, each decoder level not only uses the output from the previous decoder level but also incorporates the corresponding encoder level's output. This creates short-cut connections that allow high-fidelity details to flow more directly from input to output, potentially improving reconstruction quality.

By leveraging different aspects of the input at each level, this hierarchical structure allows the system to compress data more efficiently and restore it more accurately. Coarse levels capture global structure and context, while finer levels preserve intricate details. This multi-scale approach enables the system to adapt to various types of data and achieve a better balance between compression ratio and reconstruction quality compared to single-scale methods. The decompressed output 170 produced by this hierarchical process retains both large-scale structures and fine details of the original input, providing a high-quality reconstruction that can be further refined by subsequent stages of the system, such as the correlation network.

Figure 14:
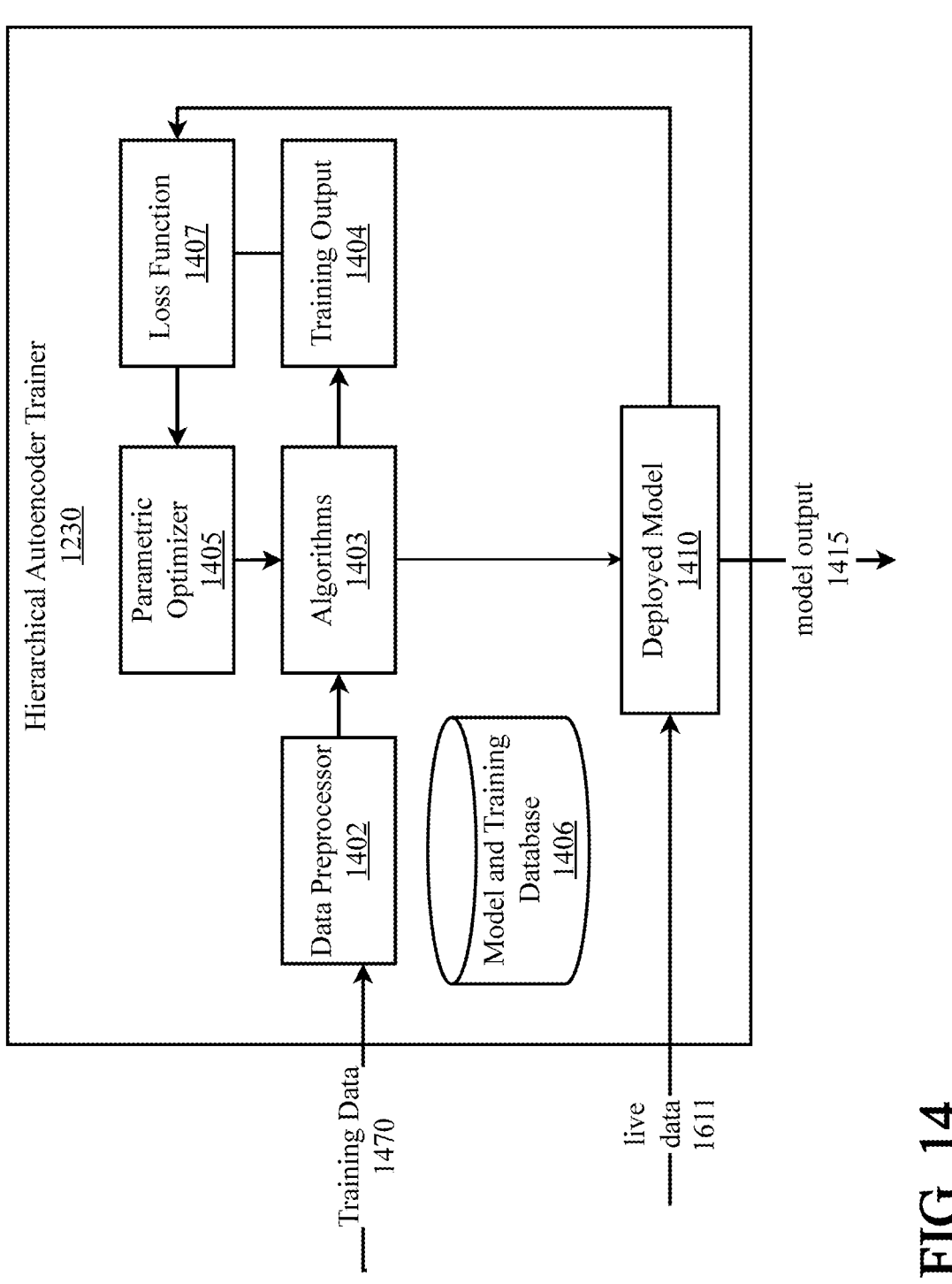
FIG. 14 is a block diagram illustrating an exemplary system architecture for a subsystem of the system for compressing and restoring data using hierarchical autoencoders and correlation networks, a hierarchical autoencoder trainer.

FIG. 14 is a block diagram illustrating an exemplary system architecture for a subsystem of the system for compressing and restoring data using hierarchical autoencoders and correlation networks, a hierarchical autoencoder trainer. According to the embodiment, the hierarchical autoencoder training system 1230 may comprise a model training stage comprising a data preprocessor 1402, one or more machine and/or deep learning algorithms 1403, training output 1404, and a parametric optimizer 1405, and a model deployment stage comprising a deployed and fully trained model 1410 configured to perform tasks described herein such as transcription, summarization, agent coaching, and agent guidance. Hierarchical autoencoder trainer 1230 may be used to train and deploy the hierarchical autoencoder network 1200 in order to support the services provided by the compression and restoration system.

At the model training stage, a plurality of training data 401 may be received at the hierarchical autoencoder trainer 270. In a use case directed to hyperspectral images, a plurality of training data may be sourced from data collectors including but not limited to satellites, airborne sensors, unmanned aerial vehicles, ground-based sensors, and medical devices. Hyperspectral data refers to data that includes wide ranges of the electromagnetic spectrum. It could include information in ranges including but not limited to the visible spectrum and the infrared spectrum. Data preprocessor 1402 may receive the input data (e.g., hyperspectral data, text data, image data, audio data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 1403 to train a predictive model for object monitoring and detection.

During model training, training output 1404 is produced and used to measure the quality and efficiency of the compressed outputs. During this process a parametric optimizer 1405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the hierarchical autoencoder trainer 1230 to evaluate a model's performance. Metrics can include, but are not limited to, compression ratio, the amount of data lost, the size of the compressed file, and the speed at which data is compressed, to name a few. In one embodiment, the system may utilize a loss function 407 to measure the system's performance. The loss function 1407 compares the training outputs with an expected output and determined how the algorithm needs to be changed in order to improve the quality of the model output. During the training stage, all outputs may be passed through the loss function 1407 on a continuous loop until the algorithms 1403 are in a position where they can effectively be incorporated into a deployed model 1415.

The test dataset can be used to test the accuracy of the model outputs. If the training model is compressing or decompressing data to the user's preferred standards, then it can be moved to the model deployment stage as a fully trained and deployed model 1410 in a production environment compressing or decompressing live input data 1411 (e.g., hyperspectral data, text data, image data, video data, audio data). Further, model compressions or decompressions made by deployed model can be used as feedback and applied to model training in the training stage, wherein the model is continuously learning over time using both training data and live data and predictions.

A model and training database 1406 is present and configured to store training/test datasets and developed models. Database 1406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 1403 may comprise a deep learning algorithm such as neural networks (e.g., recurrent, convolutional, long short-term memory networks, etc.). In some implementations, the hierarchical autoencoder trainer 1230 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 1406.

In one embodiment, hierarchical autoencoder trainer 1230 may employ a flexible approach to optimize the performance of both the hierarchical encoder and decoder networks. It can train each level of the encoders and decoders either separately or jointly, adapting to the specific requirements of the system and the characteristics of the input data. When training levels separately, the trainer focuses on optimizing each level's ability to capture or reconstruct features at its particular scale, allowing for fine-tuned performance at each stage of the compression and decompression process. This approach can be particularly useful when dealing with diverse data types or when specific levels require specialized attention. Alternatively, joint training of multiple or all levels enables the system to learn inter-level dependencies and optimize the overall compression-decompression pipeline as a cohesive unit. This can lead to improved global performance and more efficient use of the network's capacity. The trainer may also employ a hybrid approach, starting with separate level training to establish baseline performance, followed by joint fine-tuning to enhance overall system coherence. This adaptive training strategy ensures that the hierarchical autoencoder network can be optimized for a wide range of applications and data types, maximizing both compression efficiency and reconstruction quality.

FIG. 15 is a flow diagram illustrating an exemplary method for compressing and restoring data using hierarchical autoencoders and correlation networks. In a first step 1500, the system collects and preprocesses a plurality of data sets from various data sources. This initial stage involves gathering diverse data types, which may include images, videos, sensor readings, or other forms of structured or unstructured data. The preprocessing phase is crucial for preparing the data for efficient compression. It may involve tasks such as noise reduction, normalization, and feature extraction. By standardizing the input data, this step ensures that the subsequent compression process can operate effectively across different data modalities and scales.

In a step 1510, the system compresses the normalized data sets using a hierarchical multi-layer autoencoder network. This step marks the beginning of the advanced compression process, utilizing the sophisticated hierarchical structure of the autoencoder. The hierarchical approach allows for a more nuanced and efficient compression compared to traditional single-layer methods, as it can capture and preserve information at multiple scales simultaneously.

In a step 1520, the system processes the data through the level 1 encoder, focusing on large-scale features, and continues through subsequent levels, each focusing on finer-scale features. This multi-level encoding is at the heart of the hierarchical compression process. The level 1 encoder captures broad, global features of the data, while each subsequent level concentrates on increasingly fine-grained details. This approach ensures that the compressed representation retains a rich, multi-scale characterization of the original data, potentially leading to better compression ratios and more accurate reconstruction.

In a step 1530, the system outputs the multi-level compressed representation or stores it for future processing. This step represents the culmination of the compression process, where the hierarchically compressed data is either immediately utilized or securely stored. The multi-level nature of this compressed representation allows for flexible use in various applications, potentially enabling progressive decompression or scale-specific analysis without full decompression.

In a step 1540, the system inputs the multi-level compressed representation into the hierarchical decoder when decompression is required. This step initiates the reconstruction process, leveraging the multi-scale information captured during compression. The hierarchical decoder mirrors the structure of the encoder, progressively rebuilding the data from the coarsest to the finest scales.

In a step 1550, the system processes the decompressed output through a correlation network to restore data potentially lost during compression. This advanced restoration step goes beyond simple decompression, utilizing learned correlations at multiple scales to infer and recreate details that may have been diminished or lost in the compression process. The approach of the correlation network complements the hierarchical nature of the autoencoder, potentially leading to higher quality reconstructions.

In a step 1560, the system outputs the restored, reconstructed data set. This final step delivers the fully processed data, which has undergone hierarchical compression, decompression, and correlation-based enhancement. The resulting output aims to closely resemble the original input data, with the potential for even enhancing certain aspects of the data through the learned correlations and multi-scale processing.

Exemplary Computing Environment

Figure 24:
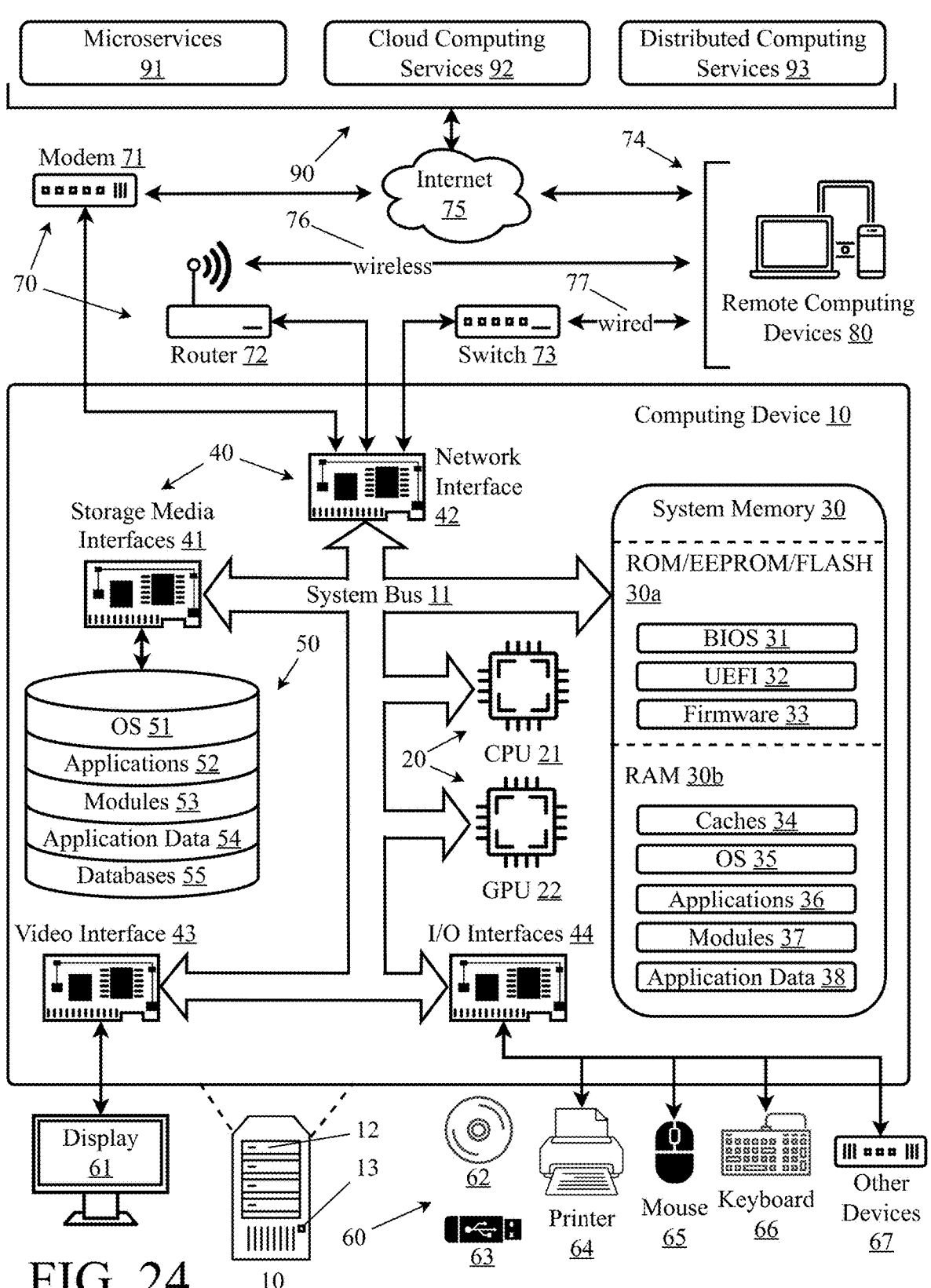
FIG. 24 illustrates an exemplary computing environment on which an embodiment described herein may be implemented, in full or in part.

FIG. 24 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and com-puter components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising:
   a hardware memory, wherein the computer system is configured to execute software instructions stored on nontransitory machine-readable storage media that:
   compress video data into multi-level hierarchical representations preserving spatiotemporal relationships at different scales;
   receive user zoom instructions specifying a region of interest and a magnification level;
   generate synthetic visual details for regions beyond original video resolution when zooming in;
   expand visual field with contextually appropriate content when zooming out;
   apply neural refinement to ensure visual coherence and consistency between original and generated content;
   render the video with transitions between original and generated content as zoom level changes; and
   maintain temporal consistency across video frames during continuous zoom operations.

2. The system of claim 1, wherein a portion of the input data sets are compressed by a plurality of encoders within a plurality of hierarchical autoencoders.

3. The system of claim 2, wherein the portion of compressed input data sets are decompressed by a plurality of decoders within the plurality of hierarchical autoencoders.

4. The system of claim 1, wherein a portion of the input data sets are compressed by a plurality of Lorentzian autoencoders.

5. The system of claim 4, wherein the portion of compressed input data sets are decompressed by a plurality of Lorentzian autoencoders.

6. A method for compressing and restoring data, comprising the steps of:
   compressing video data into multi-level hierarchical representations preserving spatiotemporal relationships at different scales;
   receiving user zoom instructions specifying a region of interest and a magnification level;
   generating synthetic visual details for regions beyond original video resolution when zooming in;
   expanding visual field with contextually appropriate content when zooming out;
   applying neural refinement to ensure visual coherence and consistency between original and generated content;
   rendering the video with transitions between original and generated content as zoom level changes; and
   maintaining temporal consistency across video frames during continuous zoom operations.

7. The method of claim 6, wherein the video data is compressed by a plurality of encoders within a plurality of hierarchical autoencoders.

8. The system of claim 7, wherein the video data is decompressed by a plurality of decoders within the plurality of hierarchical autoencoders.

9. The system of claim 6, wherein the video data is compressed by a plurality of Lorentzian autoencoders.

10. The system of claim 9, wherein the video data is decompressed by a plurality of Lorentzian autoencoders.

* * * * *